United States Patent
Zhong et al.

(10) Patent No.: US 11,038,664 B2
(45) Date of Patent: *Jun. 15, 2021

(54) METHOD AND APPARATUS FOR SENDING SERVICE, METHOD AND APPARATUS FOR RECEIVING SERVICE, AND NETWORK SYSTEM

(71) Applicant: Huawei Technologies Co., Ltd., Shenzhen (CN)

(72) Inventors: Qiwen Zhong, Shenzhen (CN); Xiaofei Xu, Beijing (CN); Xiaojun Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/922,568

(22) Filed: Jul. 7, 2020

(65) Prior Publication Data

US 2020/0336283 A1    Oct. 22, 2020

Related U.S. Application Data

(63) Continuation of application No. 16/282,690, filed on Feb. 22, 2019, now Pat. No. 10,715,306, which is a (Continued)

(30) Foreign Application Priority Data

Aug. 25, 2016    (CN) .......................... 201610723799.6

(51) Int. Cl.
   *H04L 7/00* (2006.01)
   *H04L 12/931* (2013.01)
   (Continued)

(52) U.S. Cl.
   CPC .......... *H04L 7/0008* (2013.01); *H04J 3/0658* (2013.01); *H04J 3/1611* (2013.01); (Continued)

(58) Field of Classification Search
   CPC ......... H04L 7/008; H04L 7/02; H04L 7/0331; H04L 7/0337; H04L 7/033; H04J 3/0658; H04J 3/1611; H04J 3/1652
   (Continued)

(56) References Cited

U.S. PATENT DOCUMENTS 5,384,774 A * 1/1995 Martin .................. H04J 3/0632
                                                     370/395.51
6,526,053 B1    2/2003 Ishiba et al.
(Continued)

FOREIGN PATENT DOCUMENTS

CN       1747474 A       3/2006
CN     101061466 A      10/2007
(Continued)

OTHER PUBLICATIONS

Anonymous, "Generic Framing Protocol," XP055590434, retrieved from the internet: URL: http://mapyourtech.com/entries/general/generic-framing-protocol, Apr. 7, 2014, 6 pages.
(Continued)

*Primary Examiner* — Ted M Wang
(74) *Attorney, Agent, or Firm* — Slater Matsil, LLP

(57) ABSTRACT

Embodiments of the present invention disclose a method and an apparatus for sending a service, a method and an apparatus for receiving a service, and a network system. The method for sending a service includes: obtaining, by a transmit end device, an original data stream; inserting a quantity mark k into the original data stream, to generate a first data stream, where the quantity mark k is a quantity of
(Continued)

first data units in the original data stream, and k is greater than or equal to 0; and sending the first data stream.

21 Claims, 30 Drawing Sheets

Related U.S. Application Data continuation of application No. PCT/CN2017/098490, filed on Aug. 22, 2017.

(51) Int. Cl.
*H04J 3/16* (2006.01)
*H04J 3/06* (2006.01)

(52) U.S. Cl.
CPC .......... *H04J 3/1652* (2013.01); *H04J 3/1658* (2013.01); *H04L 49/352* (2013.01); *H04J 2203/0085* (2013.01)

(58) Field of Classification Search
USPC .......................................................... 375/354
See application file for complete search history.

(56) References Cited

U.S. PATENT DOCUMENTS

| | | | |
|---|---|---|---|
| 6,948,013 | B2 | 9/2005 | Leyrer |
| 2004/0136401 | A1 | 7/2004 | Ichino |
| 2004/0202198 | A1 | 10/2004 | Walker et al. |
| 2008/0075113 | A1 | 3/2008 | Harley et al. |
| 2009/0154475 | A1 | 6/2009 | Lautenschlaeger |
| 2010/0086300 | A1 | 4/2010 | Jiang |
| 2010/0091864 | A1 | 4/2010 | Tada et al. |
| 2011/0276750 | A1 | 11/2011 | Kim et al. |
| 2013/0004168 | A1 | 1/2013 | Ohara et al. |
| 2016/0323164 | A1* | 11/2016 | Cao ...................... H04L 43/0811 |
| 2017/0324657 | A1* | 11/2017 | Zhong ........................ H04L 1/00 |

FOREIGN PATENT DOCUMENTS

| | | | |
|---|---|---|---|
| CN | 101123584 | A | 2/2008 |
| CN | 102761489 | A | 10/2012 |
| CN | 103916217 | A | 7/2014 |
| EP | 2139204 | A1 | 12/2009 |
| EP | 2154868 | A1 | 2/2010 |
| JP | H09247156 | A | 9/1997 |
| JP | 2004180215 | A | 6/2004 |
| JP | 2009105723 | A | 5/2009 |
| JP | 2011507430 | A | 3/2011 |
| JP | 2011193126 | A | 9/2011 |
| WO | 2008149448 | A1 | 12/2008 |
| WO | 2009115481 | A1 | 9/2009 |
| WO | WO-2015106386 | A1 * | 7/2015 ............. H04L 69/12 |

OTHER PUBLICATIONS

Flex Ethernet, Implementation Agreement, IA # OIF-FLEXE-01.0, Optical Internetworking Forum, Mar. 2016, 31 pages.

\* cited by examiner

| 0000000001111111111222222222233333333334444444444555555555566666666 | | | | | | | | |
|---|---|---|---|---|---|---|---|---|
| 0123456789012345678901234567890123456789012345678901234567890123456 | | | | | | | | |
| 10 | 0x78 | D1(0x55) | D2(0x55) | D3(0x55) | D4(0x55) | D5(0x55) | D6(0x55) | D7(0xD5) |

METHOD AND APPARATUS FOR SENDING SERVICE, METHOD AND APPARATUS FOR RECEIVING SERVICE, AND NETWORK SYSTEM

CROSS-REFERENCE TO RELATED APPLICATIONS

This application is a continuation of U.S. patent application Ser. No. 16/282,690, filed on Feb. 22, 2019, which is a continuation of International Application No. PCT/CN2017/098490, filed on Aug. 22, 2017. The International Application claims priority to Chinese Patent Application No. 201610723799.6, filed on Aug. 25, 2016. All of the aforementioned patent applications are hereby incorporated by reference in their entireties.

TECHNICAL FIELD

The present invention relates to the communications field, and in particular, to a method and an apparatus for sending a service, a method and an apparatus for receiving a service, and a network system.

BACKGROUND

The flexible Ethernet (FlexE) combines some technical features of the Ethernet and a transport network (for example, an optical transport network (OTN), and a synchronous digital hierarchy (SDH)), and is an important milestone in the evolution of an Ethernet technology. With emergence of a flexible Ethernet technology, Ethernet physical interfaces show virtualization characteristics. A plurality of Ethernet physical interfaces may be bonded together, to support several virtual logical ports. For example, a 400-gigabit (400 G) flexible Ethernet physical interface group obtained by bonding four 100-gigabit Ethernet (100 GE) physical interfaces may support several logical ports.

The Ethernet physical interface is an asynchronous communications interface, and is allowed to have a clock frequency difference of ±100 ppm (one ten-thousandth). For example, in 10 GE, for two physical interfaces whose nominal bandwidths are 10 G, one bandwidth may be one ten-thousandth larger than the nominal value, and the other bandwidth is one ten-thousandth smaller than the nominal value, that is, 10 G*(1+0.0001) and 10 G*(1−0.0001). A clock frequency at the logical port inherits a clock frequency characteristic on the physical interface, and therefore the logical port also has a difference of 100 ppm. For example, actual bandwidths of two logical ports that are formed by different physical interfaces or physical interface groups and whose nominal bandwidths are 25 G may be approximately 25 G*(20460/20461)*(1+0.0001) and 25 G*(20460/20461)*(1−0.0001) when overheads of timeslot division and timeslot management in the flexible Ethernet are considered. When the flexible Ethernet is used to bear a service, idle-code-block (Idle) insertion or deletion needs to be performed hop by hop, to adapt a service rate to a bandwidth rate difference between the service and the physical interfaces or the logical ports. FIG. 1 is a schematic diagram of service transport in the flexible Ethernet in the prior art. As shown in FIG. 1, when a service between customer devices Ca and Cb is borne by using flexible Ethernet devices Pa, Pb, and Pc, the Pa, the Pb, and the Pc needs to perform idle-unit insertion or deletion.

However, idle-code-block insertion or deletion causes loss of a clock frequency and time phase information of the service, that is, the clock frequency and the time phase information of the service cannot be transparently transported, and consequently the clock frequency and the time phase cannot be synchronized between a source network device and a sink network device of the service.

SUMMARY

In view of this, embodiments of the present invention provide a method and an apparatus for sending a service, a method and an apparatus for receiving a service, and a network system, to resolve the following problem: Because a clock frequency and time phase information of a service cannot be transparently transported in the flexible Ethernet, the clock frequency and the time phase cannot be synchronized between a source network device and a sink network device of the service.

According to a first aspect, an embodiment of the present invention provides a method for sending a service, including: A transmit end device obtains an original data stream; next, the transmit end device inserts a quantity mark k into the original data stream, to generate a first data stream, where the quantity mark k is used to identify a quantity of first data units in the original data stream, and k is greater than or equal to 0; and finally, the transmit end device sends the first data stream.

According to the technical solutions in the present invention, the quantity mark k is inserted into the original data stream, and is used to identify the quantity of first data units in the original data stream. In this way, a receive end device can recover, according to the quantity mark k, the original data stream from a data stream on which idle-unit insertion or deletion is performed, to recover a clock frequency and time phase information of the original data stream, so that a clock frequency and time phase information of a service are transparently transported.

In a possible implementation, the inserting a quantity mark k into the original data stream includes: obtaining a first segment of data stream from the original data stream, and determining a quantity of first data units in the first segment of data stream; and inserting the quantity mark k at a first location in the first segment of data stream, where a value of the quantity mark k is equal to the quantity of first data units in the first segment of data stream, and the first location is a location of a data unit that can be used to carry the quantity mark k.

The original data stream is divided into segments, so that the quantity mark k can be inserted by segment.

In a possible implementation, the first data unit includes all data units in the first segment of data stream, and k is an integer greater than 0.

In a process of transporting the original data stream, an idle unit may be inserted or deleted, and this causes a change of a quantity of data units in the original data stream. Therefore, a quantity of all data units in the first segment of data stream in the original data stream can be identified by using the quantity mark k.

In a possible implementation, the first data unit is an idle unit in the first segment of data stream, and k is an integer greater than or equal to 0.

Only an idle unit is inserted or deleted in a process of transporting the original data stream. Therefore, a quantity of idle units in the first segment of data stream in the original data stream can be identified by using the quantity mark k.

In a possible implementation, the obtaining a first segment of data stream from the original data stream includes:

identifying a start unit in the original data stream, and determining a location of the start unit as the first location.

The start unit may be a code block unit having a fixed pattern, that is, having redundant information, and therefore can be used to carry the quantity mark k. Optionally, the location of the start unit may be further determined as a boundary of the first segment of data stream. That is, the start unit may be used to carry the quantity mark k, and may be further used to determine a boundary between two adjacent segments of data streams.

In a possible implementation, the obtaining a first segment of data stream from the original data stream includes: setting a threshold of the quantity mark k; when a length of the first segment of data stream is greater than or equal to the threshold, identifying a first idle unit in the first segment of data stream; and determining a location of the first idle unit as the first location.

The idle unit has redundant information, and therefore can be used to carry the quantity mark k. However, to prevent the idle unit from being excessively used to carry the quantity mark k, k can be inserted into the idle unit only when a length of a segment of data stream is greater than a specific threshold. Optionally, the location of the first idle unit may be further determined as a boundary of the first segment of data stream. That is, the first idle unit may be used to carry the quantity mark k, and may be further used to determine a boundary between two adjacent segments of data streams.

In a possible implementation, encoding processing has been performed on the first data unit, or encoding processing has not been performed on the first data unit.

The technical solutions of the present invention may be implemented before the original data stream is encoded, or may be implemented after the original data stream is encoded.

In a possible implementation, after the first data stream is generated, the method further includes: increasing and/or decreasing a quantity of idle units in the first data stream.

After the quantity mark k is inserted, an idle unit in the first data stream that carries the quantity mark k may be inserted or deleted.

According to a second aspect, an embodiment of the present invention provides a method for receiving a service, including: receiving, by a receive end device, a first data stream; extracting a quantity mark k from the first data stream, and determining a quantity of first data units in the first data stream, where k is greater than or equal to 0; and recovering the original data stream from the first data stream, where a quantity of first data units in the original data stream is equal to k.

According to the technical solutions in the present invention, the quantity mark k is extracted from the first data stream, the quantity of first data units in the original data stream is determined according to the quantity mark k, and the original data stream is recovered from the first data stream. The receive end device recovers the original data stream from a data stream on which idle-unit insertion or deletion is performed, to recover a clock frequency and time phase information of the original data stream, so that a clock frequency and time phase information of a service are transparently transported.

In a possible implementation, the extracting a quantity mark k from the first data stream includes: obtaining a first segment of data stream from the first data stream, determining a first location in the first segment of data stream, and extracting the quantity mark k from the first location, where the first location is a location of a data unit that can be used to carry the quantity mark k.

The first data stream is divided into segments, so that the quantity mark k can be extracted by segment.

In a possible implementation, the first data unit includes all data units in the first segment of data stream, and k is an integer greater than 0.

In a process of transporting the original data stream, an idle unit may be inserted or deleted, and this causes a change of a quantity of data units in the original data stream. Therefore, a quantity of all data units included in the original data stream after the original data stream is recovered from the first segment of data stream can be identified by using the quantity mark k.

In a possible implementation, the first data unit is an idle unit in the first segment of data stream, and k is an integer greater than or equal to 0.

Only an idle unit is inserted or deleted in a process of transporting the original data stream. Therefore, a quantity of idle units included in the original data stream after the original data stream is recovered from the first segment of data stream can be identified by using the quantity mark k.

In a possible implementation, the recovering the original data stream from the first data stream includes: determining a quantity m of first data units in the first segment of data stream, and adjusting the quantity m of first data units in the first segment of data stream according to a difference between m and k, so that m is equal to k.

The original data stream is recovered from the first data stream according to the difference between the quantity of first data units in the first segment of data stream in the first data stream and the quantity mark k, so that the first segment of data stream and the original data stream have a same quantity of first data units.

In a possible implementation, the adjusting the quantity m of first data units in the first segment of data stream according to a difference between m and k includes: when m is greater than k, deleting (m−k) idle units from the first segment of data stream; or when m is less than k, inserting (k−m) idle units into the first segment of data stream.

The original data stream is recovered from the first data stream by means of reverse idle-unit insertion or deletion.

In a possible implementation, the method further includes: recovering a clock frequency of the original data stream.

After the original data stream is recovered from the first data stream, the clock frequency of the original data stream may be recovered, so that a clock frequency of a service is transparently transported.

According to a third aspect, an embodiment of the present invention provides an apparatus for sending a service, including: an obtaining module, configured to obtain an original data stream; an insertion module, configured to insert a quantity mark k into the original data stream, to generate a first data stream; where the quantity mark k is used to identify a quantity of first data units in the original data stream, and k is greater than or equal to 0; and a sending module, configured to send the first data stream.

According to the technical solutions in the present invention, the quantity mark k is inserted into the original data stream, and is used to identify the quantity of first data units in the original data stream. In this way, an apparatus for receiving a service can recover, according to the quantity mark k, the original data stream from a data stream on which idle-unit insertion or deletion is performed, to recover a clock frequency and time phase information of the original data stream, so that a clock frequency and time phase information of a service are transparently transported.

In a possible implementation, the insertion module is configured to: obtain a first segment of data stream from the original data stream, and determine a quantity of first data units in the first segment of data stream; and insert the quantity mark k at a first location in the first segment of data stream, where a value of the quantity mark k is equal to the quantity of first data units in the first segment of data stream, and the first location is a location of a data unit that can be used to carry the quantity mark k.

The original data stream is divided into segments, so that the quantity mark k can be inserted by segment.

In a possible implementation, the first data unit includes all data units in the first segment of data stream, and k is an integer greater than 0.

In a process of transporting the original data stream, an idle unit may be inserted or deleted, and this causes a change of a quantity of data units in the original data stream. Therefore, a quantity of all data units in the first segment of data stream in the original data stream can be identified by using the quantity mark k.

In a possible implementation, the first data unit is an idle unit in the first segment of data stream, and k is an integer greater than or equal to 0.

Only an idle unit is inserted or deleted in a process of transporting the original data stream. Therefore, a quantity of idle units in the first segment of data stream in the original data stream can be identified by using the quantity mark k.

In a possible implementation, the insertion module is configured to: identify a start unit in the original data stream, and determine a location of the start unit as the first location.

The start unit may be a code block unit having a fixed pattern, that is, having redundant information, and therefore can be used to carry the quantity mark k. Optionally, the location of the start unit may be further determined as a boundary of the first segment of data stream. That is, the start unit may be used to carry the quantity mark k, and may be further used to determine a boundary between two adjacent segments of data streams.

In a possible implementation, the insertion module is configured to: set a threshold of the quantity mark k; when a length of the first segment of data stream is greater than or equal to the threshold, identify a first idle unit in the first segment of data stream; and determine a location of the first idle unit as the first location.

The idle unit has redundant information, and therefore can be used to carry the quantity mark k. However, to prevent the idle unit from being excessively used to carry the quantity mark k, k can be inserted into the idle unit only when a length of a segment of data stream is greater than a specific threshold. Optionally, the location of the first idle unit may be further determined as a boundary of the first segment of data stream. That is, the first idle unit may be used to carry the quantity mark k, and may be further used to determine a boundary between two adjacent segments of data streams.

In a possible implementation, encoding processing has been performed on the first data unit, or encoding processing has not been performed on the first data unit.

The technical solutions of the present invention may be implemented before the original data stream is encoded, or may be implemented after the original data stream is encoded.

In a possible implementation, the apparatus further includes: an insertion or deletion module, configured to increase and/or decrease a quantity of idle units in the first data stream.

After the quantity mark k is inserted, an idle unit in the first data stream that carries the quantity mark k may be inserted or deleted.

According to a fourth aspect, an embodiment of the present invention provides an apparatus for receiving a service, including: a receiving module, configured to receive a first data stream; an extraction module, configured to: extract a quantity mark k from the first data stream, and determine a quantity of first data units in the first data stream, where k is greater than or equal to 0; and a recovery module, configured to recover the original data stream from the first data stream, where a quantity of first data units in the original data stream is equal to k.

According to the technical solutions in the present invention, the quantity mark k is extracted from the first data stream, the quantity of first data units in the original data stream is determined according to the quantity mark k, and the original data stream is recovered from the first data stream. The apparatus for receiving a service recovers the original data stream from a data stream on which idle-unit insertion or deletion is performed, to recover a clock frequency and time phase information of the original data stream, so that a clock frequency and time phase information of a service are transparently transported.

In a possible implementation, the extraction module is configured to: obtain a first segment of data stream from the first data stream, determine a first location in the first segment of data stream, and extract the quantity mark k from the first location, where the first location is a location of a data unit that can be used to carry the quantity mark k.

The first data stream is divided into segments, so that the quantity mark k can be extracted by segment.

In a possible implementation, the first data unit includes all data units in the first segment of data stream, and k is an integer greater than 0.

In a process of transporting the original data stream, an idle unit may be inserted or deleted, and this causes a change of a quantity of data units in the original data stream. Therefore, a quantity of all data units included in the original data stream after the original data stream is recovered from the first segment of data stream can be identified by using the quantity mark k.

In a possible implementation, the first data unit is an idle unit in the first segment of data stream, and k is an integer greater than or equal to 0.

Only an idle unit is inserted or deleted in a process of transporting the original data stream. Therefore, a quantity of idle units included in the original data stream after the original data stream is recovered from the first segment of data stream can be identified by using the quantity mark k.

In a possible implementation, the recovery module is configured to: determine a quantity m of first data units in the first segment of data stream, and adjust the quantity m of first data units in the first segment of data stream according to a difference between m and k, so that m is equal to k.

The original data stream is recovered from the first data stream according to the difference between the quantity of first data units in the first segment of data stream in the first data stream and the quantity mark k, so that the first segment of data stream and the original data stream have a same quantity of first data units.

In a possible implementation, the recovery module is configured to: when m is greater than k, delete (m−k) idle units from the first segment of data stream; or when m is less than k, insert (k−m) idle units into the first segment of data stream.

The original data stream is recovered from the first data stream by means of reverse idle-unit insertion or deletion.

In a possible implementation, the apparatus further includes: a clock module, configured to recover a clock frequency of the original data stream.

After the original data stream is recovered from the first data stream, the clock frequency of the original data stream may be recovered, so that a clock frequency of a service is transparently transported.

According to a fifth aspect, an embodiment of the present invention provides a network system, including: the apparatus according to any one of the third aspect or the possible implementations of the third aspect and the apparatus according to any one of the fourth aspect or the possible implementations of the fourth aspect.

According to a sixth aspect, an embodiment of the present invention provides a network device, including: a processor, a memory, and at least one network interface, where the memory is configured to store a computer-executable instruction, and when the network device runs, the processor executes the computer-executable instruction stored in the memory, so that the network device executes the method according to any one of the first aspect or the possible implementations of the first aspect.

According to a seventh aspect, an embodiment of the present invention provides a network device, including: a processor, a memory, and at least one network interface, where the memory is configured to store a computer-executable instruction, and when the network device runs, the processor executes the computer-executable instruction stored in the memory, so that the network device executes the method according to any one of the second aspect or the possible implementations of the second aspect.

BRIEF DESCRIPTION OF THE DRAWINGS

To describe the technical solutions in the embodiments of the present invention or in the prior art more clearly, the following briefly describes the accompanying drawings required for describing the background and the embodiments.

FIG. 6 is a schematic diagram of a format of a start code block according to an embodiment of the present invention;

FIG. 7 is a schematic diagram of formats of six code blocks according to an embodiment of the present invention;

FIG. 8 is a schematic diagram of formats of three code blocks according to an embodiment of the present invention;

FIG. 9 is a schematic diagram of a format of a data stream according to an embodiment of the present invention;

FIG. 10 is a schematic diagram of a format of a code block according to an embodiment of the present invention;

FIG. 12 is a schematic diagram of a format of a data stream according to an embodiment of the present invention;

FIG. 13 is a schematic diagram of another format of a data stream according to an embodiment of the present invention;

FIG. 1 is an example flowchart of a method for sending a service according to an embodiment of the present invention;

FIG. 18 is a schematic diagram of formats of four code blocks according to an embodiment of the present invention;

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments.

The technical solutions provided in the embodiments of the present invention may be applied to the flexible Ethernet, and may also be applied to another type of network, such as the Ethernet, an optical transport network (OTN) network, or a synchronous digital hierarchy (SDH) network. The embodiments of the present invention are mainly described by using the flexible Ethernet as an example.

Figure 1:
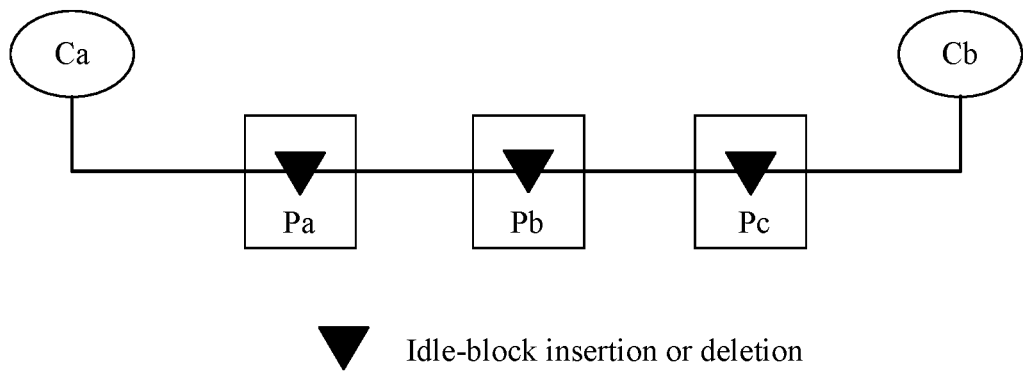
FIG. 1 is a schematic diagram of service transport in the flexible Ethernet in the prior art.
Figure 2A:
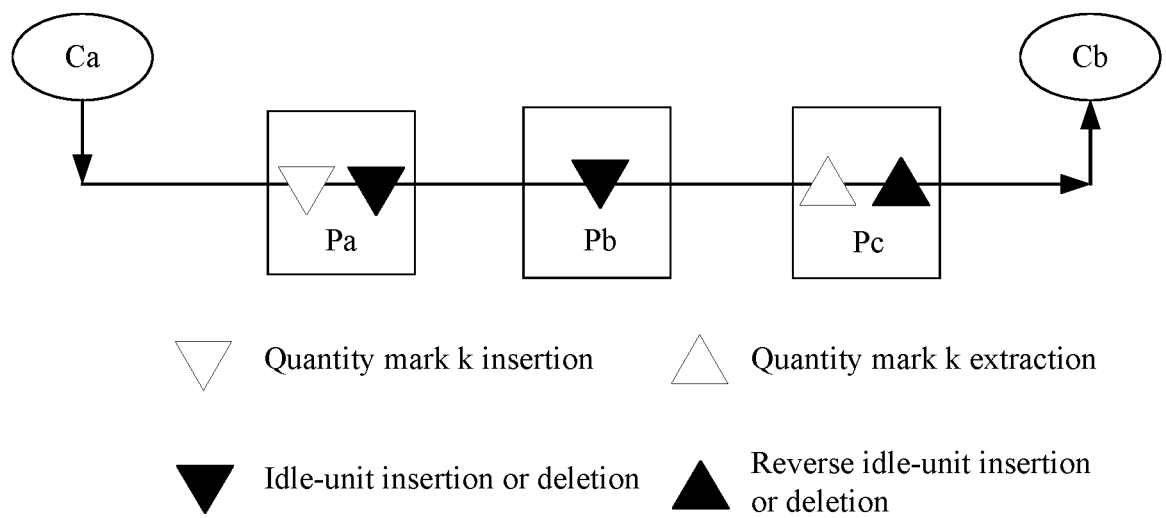
FIG. 2a is a schematic diagram of service transport in the flexible Ethernet according to an embodiment of the present invention.

FIG. 2a is a schematic diagram of service transport in the flexible Ethernet according to an embodiment of the present invention. As shown in FIG. 2a, a customer device Ca needs to send a service to a customer device Cb, and service transport may be performed between the Ca and the Cb by using a bearer network. For example, the flexible Ethernet including a plurality of flexible Ethernet devices (for example, Pa, Pb, and Pc) is used as the bearer network. The customer device may be a device such as a router or a switch, and the flexible Ethernet device may be an Ethernet device, an OTN device, an SDH device, or the like.

In this embodiment of the present invention, to implement transparent transport of a clock frequency and time phase information of a service, after receiving an original data stream of a service from the customer device Ca, a transmit end device Pa in the flexible Ethernet may insert a quantity mark k into the original data stream, to identify a quantity of data units in the original data stream. The data unit includes an idle unit and a non-idle unit. The idle unit has a fixed data format. The non-idle unit is a data unit different from the idle unit, and includes a plurality of data formats. In this embodiment of the present invention, only a quantity of idle units may be marked, or a quantity of all data units may be marked. After inserting the quantity mark k, the transmit end device Pa may further perform same idle-unit insertion or deletion as in the prior art. An intermediate device Pb in the flexible Ethernet may perform same idle-unit insertion or deletion as in the prior art. The intermediate device may further include a plurality of devices, that is, a plurality of times of idle-unit insertion or deletion may be performed on the original data stream. A receive end device Pc in the flexible Ethernet extracts the quantity mark k, and performs reverse idle-unit insertion or deletion according to the quantity mark k, that is, recovers the original data stream. Reverse idle-unit insertion or deletion means: if n idle units are inserted into the original data stream, the receive end device Pc deletes n idle units, or if n idle units are deleted from the original data stream, the receive end device Pc inserts n idle units. The recovered original data stream and the original data stream existing before idle-unit insertion or deletion is performed have a same quantity of data units or idle units. Therefore, the receive end device Pc can recover a clock frequency and time phase information of the original data stream according to the recovered original data stream, so that a clock frequency and time phase information of a service are transparently transported.

Figure 2B:
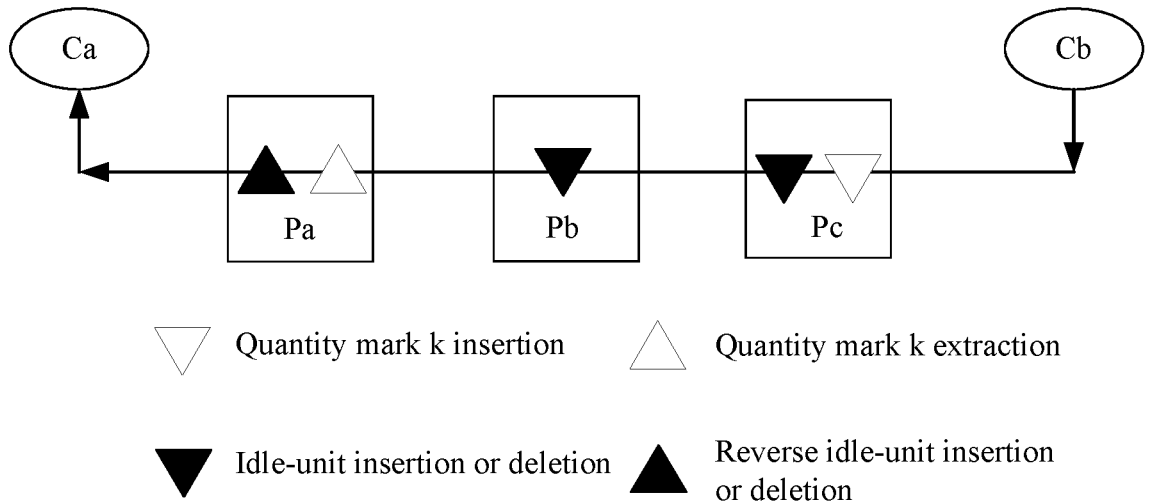
FIG. 2b is a schematic diagram of service transport in the flexible Ethernet according to an embodiment of the present invention.

FIG. 2b is a schematic diagram of service transport in the flexible Ethernet according to an embodiment of the present invention. As shown in FIG. 2b, a service is sent from a customer device Cb to a customer device Ca, and an execution procedure is opposite to that in FIG. 2a. For example, a step performed by Pc in FIG. 2b is the same as a step performed by the Pa in FIG. 2a, and a step performed by Pa in FIG. 2b is the same as a step performed by the Pc in FIG. 2a.

Figure 3:
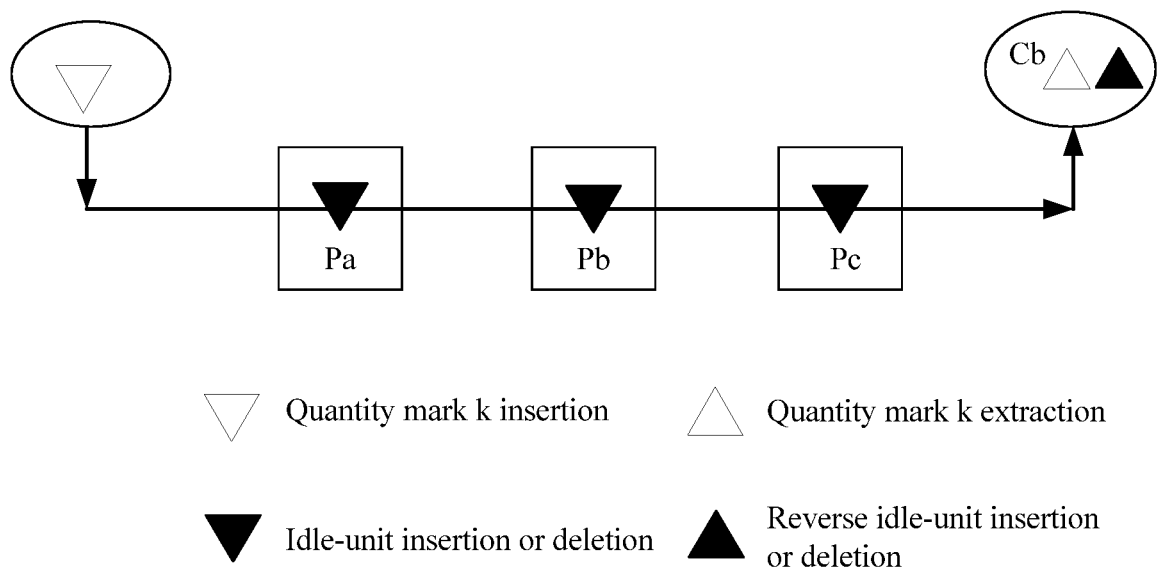
FIG. 3 is a schematic diagram of another type of service transport in the flexible Ethernet according to an embodiment of the present invention.

FIG. 3 is a schematic diagram of another type of service transport in the flexible Ethernet according to an embodiment of the present invention. As shown in FIG. 3, that a service is sent from a customer device Ca to a customer device Cb is used as an example for description. The customer device Ca may insert quantity mark k, and the customer device Cb may extract the quantity mark k, and perform reverse idle-unit insertion or deletion, to recover original data. Flexible Ethernet devices such as Pa, Pb, and Pc may perform same idle-unit insertion or deletion as in the prior art, without a need to make any improvement, so that the technical solutions in the present invention is well compatible with the existing flexible Ethernet.

An example is used below to describe a principle of marking a quantity of idle units in the embodiments of the present invention. A data format of an original data stream may include a data format existing after encoding, or may include a data format existing when encoding is not performed. A format of the idle unit may include an idle code block, an idle byte unit, or the like.

The data format existing after encoding is described by using 64b/66b encoding as an example.

Figure 4:
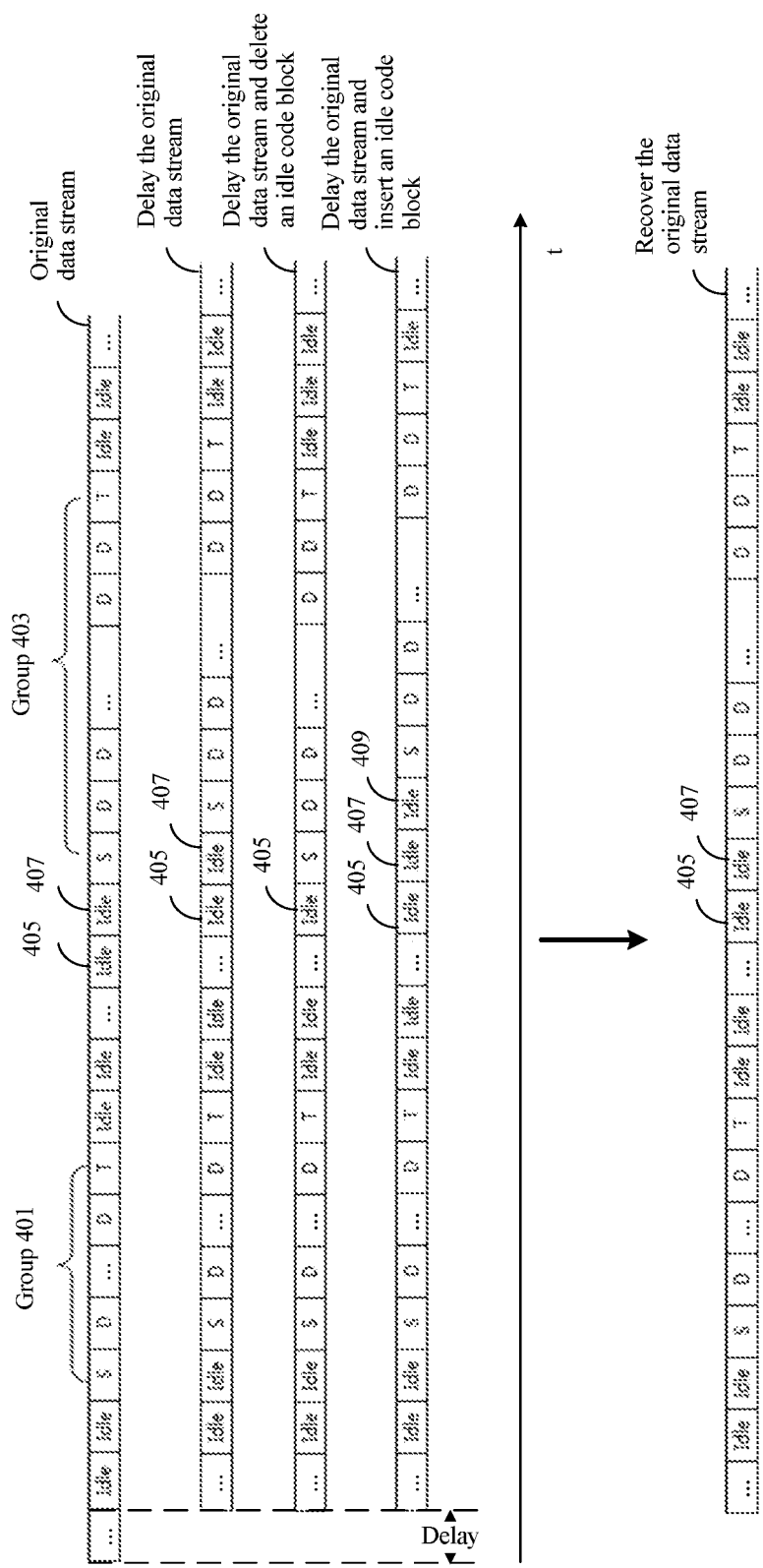
FIG. 4 is a schematic diagram of a format of a data stream according to an embodiment of the present invention.

FIG. 4 is a schematic diagram of a format of a data stream according to an embodiment of the present invention. As shown in FIG. 4, in an original data stream, a start code block S, a termination code block T, and a plurality of code blocks D are considered as a group, for example, a group 401 and a group 403 shown in the figure. There may be one or more idle code blocks (Idle) between any two groups, for example, an idle code block 405 and an idle code block 407 shown in the figure. After receiving the original data stream at time t, a transmit end device may further delay the original data stream, for example, delay the original data stream by one code block in FIG. 4. After delaying the original data stream, the transmit end device or an intermediate device may perform an insertion or deletion operation on the idle code block. For example, FIG. 4 shows two cases: The idle code block 407 is deleted from the original data stream, and an idle code block 409 is inserted into the original data stream. A receive end device recovers the original data stream from a data stream on which idle-code-block insertion or deletion is performed.

Figure 5:
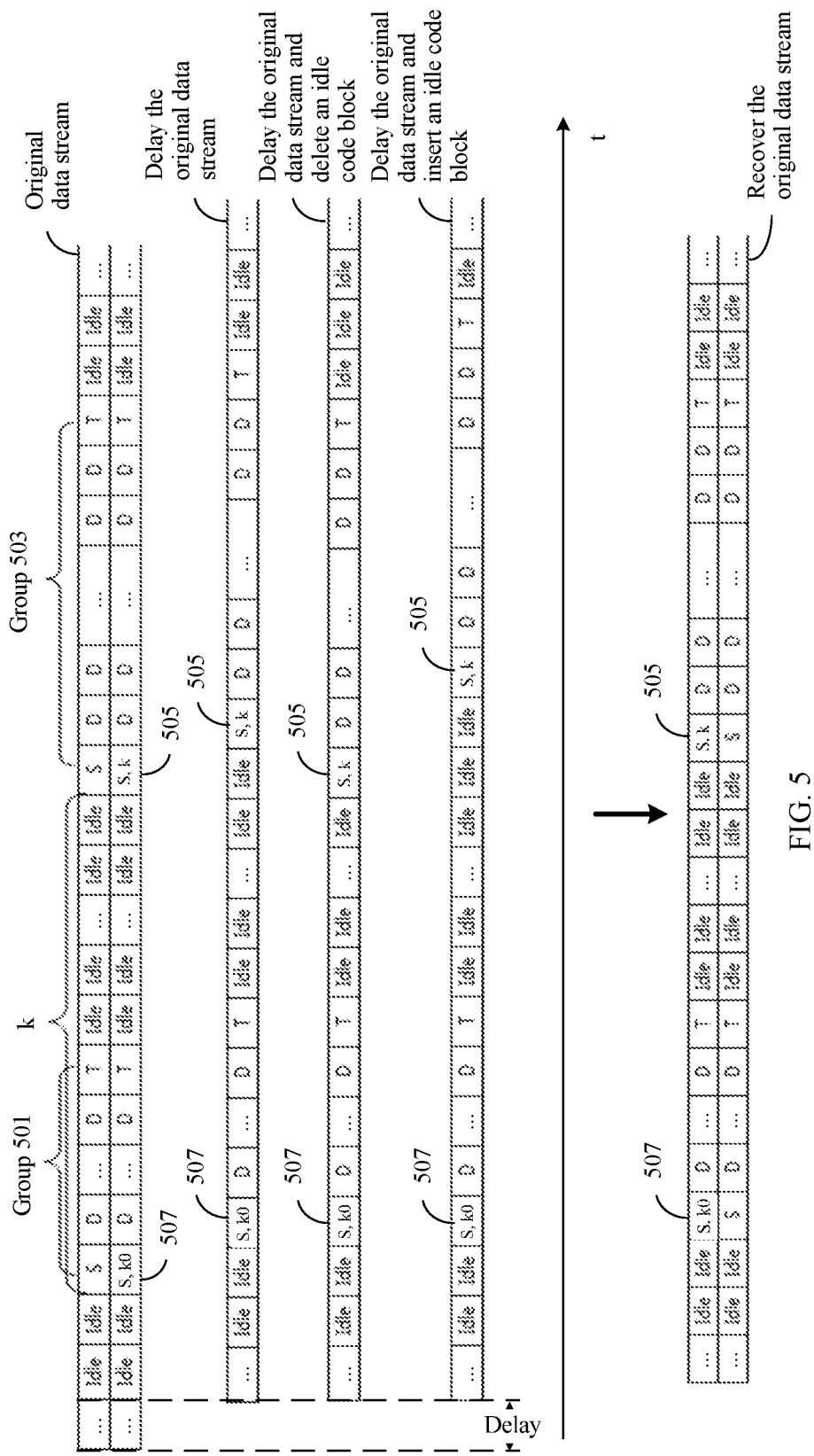
FIG. 5 is a schematic diagram of another format of a data stream according to an embodiment of the present invention.

FIG. 5 is a schematic diagram of another format of a data stream according to an embodiment of the present invention. As shown in FIG. 5, after receiving an original data stream at time t, a transmit end device may insert a quantity mark k into a start code block (for example, a start code block 505) in the original data stream. In a process in which the transmit end device or an intermediate device performs idle-code-block insertion or deletion, the quantity mark k always exists in the data stream, until the quantity mark k is extracted by a receive end device for recovering the original data. As shown in FIG. 5, a group 501 and a group 503 are included. The group 501 and the group 503 may be adjacent groups, or there may be another group between the group 501 and the group 503. That is, one quantity mark k may be inserted for one group, or one quantity mark k may be inserted for a plurality of groups. Code blocks between a start code block of the group 501 and a start code block of the group 503 are considered as a segment of data stream (including the start code block of the group 501, and excluding the start code block of the group 503) whose length is k. The quantity mark k may be inserted into the start code block 505, and the quantity mark k may be used to identify a quantity of all code blocks in the segment of data stream whose length is k. In this embodiment of the present invention, k does not include the start code block 505 of the group 503; or certainly, may include the start code block of the group 503. This is not limited in the present invention. Because a quantity of non-idle code blocks is unchanged, and only an idle code block is inserted or deleted, the quantity mark k may be further used to directly identify a quantity of idle code blocks. The idle code block may exist between groups, or may exist in the group. The figure further shows the start code block 507 into which a quantity mark k0 is inserted in the group 501, and a function of the start code block 507 is similar to that of the start code block 505 carrying the quantity mark k. Details are not described herein.

Because a start code block S in an Ethernet (including the flexible Ethernet) data frame is a code block with a fixed bit pattern, and is not changed in a transport process, the start code block S includes redundant information, and can be used to carry information such as a quantity mark k. For example, on a media independent interface (MII) interface, a preamble element includes 8-byte transmit (character) data (TXD)/received (character) data (RXD), and is indicated by using 8-bit transmit (character) control (signals) XC)/received (character) control (signals) (RXC). For example, <TXC,TXD> of the preamble element is as follows: <1,0xFB> <0, 0x55> <0,0x55> <0,0x55> <0,0x55> <0,0x55> <0,0x55> <0,0xD5>, where 0xFB is a start-of-frame control character "/S/", and 0xD5 is a start-of-frame delimiter (SFD). A data format of the encoded preamble element is referred to as a start code block, and a boundary of the 8-byte preamble element is aligned with a boundary of a 64b/66b code block, for example, "/S/" is aligned with a boundary of the start code block. FIG. 6 is a 64b/66b encoding format of a start code block according to an embodiment of the present invention, where the start code block includes a synchronization header "10" and a control code block type "0x78".

Figure 7:
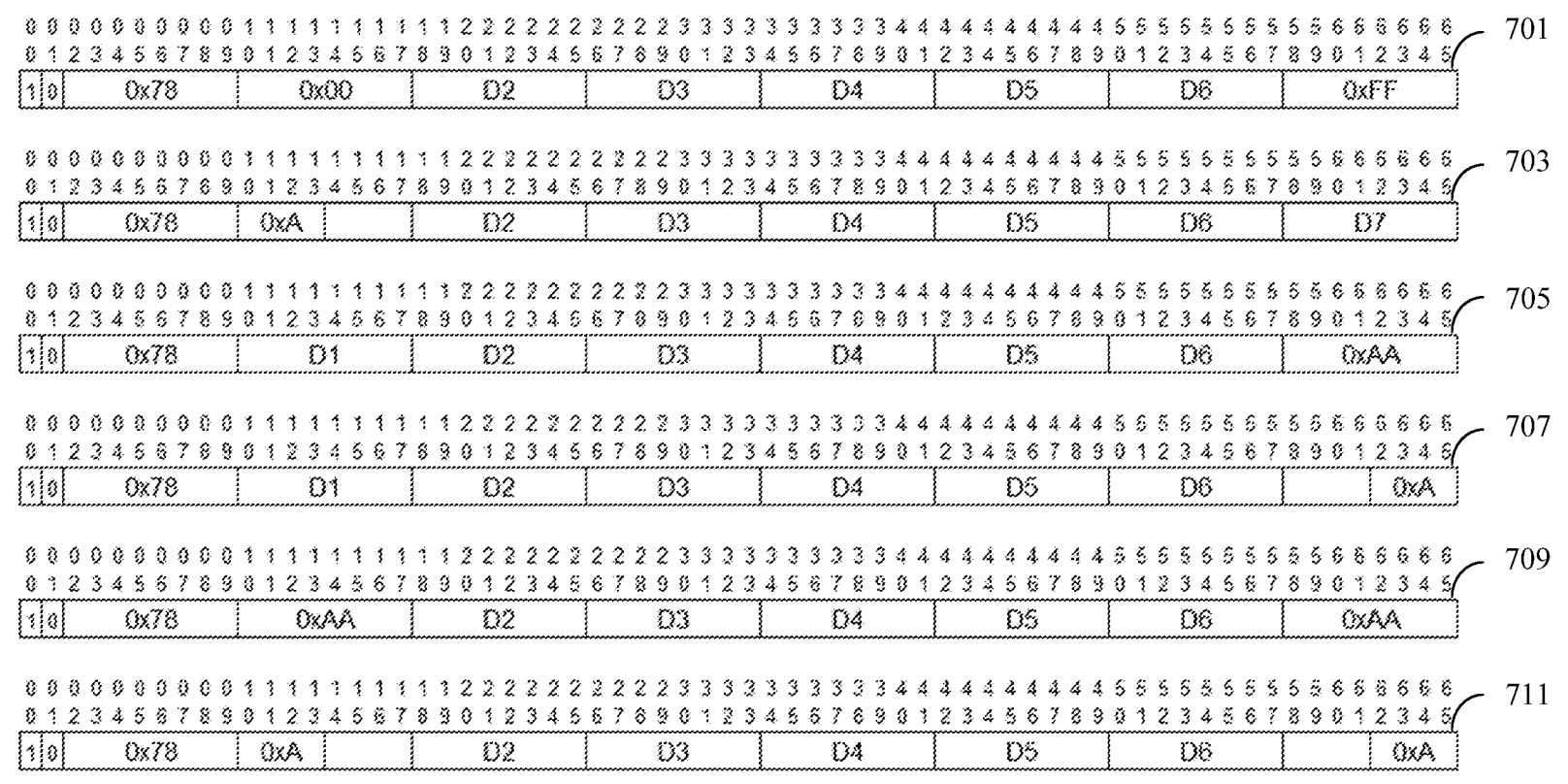
Figure 8:
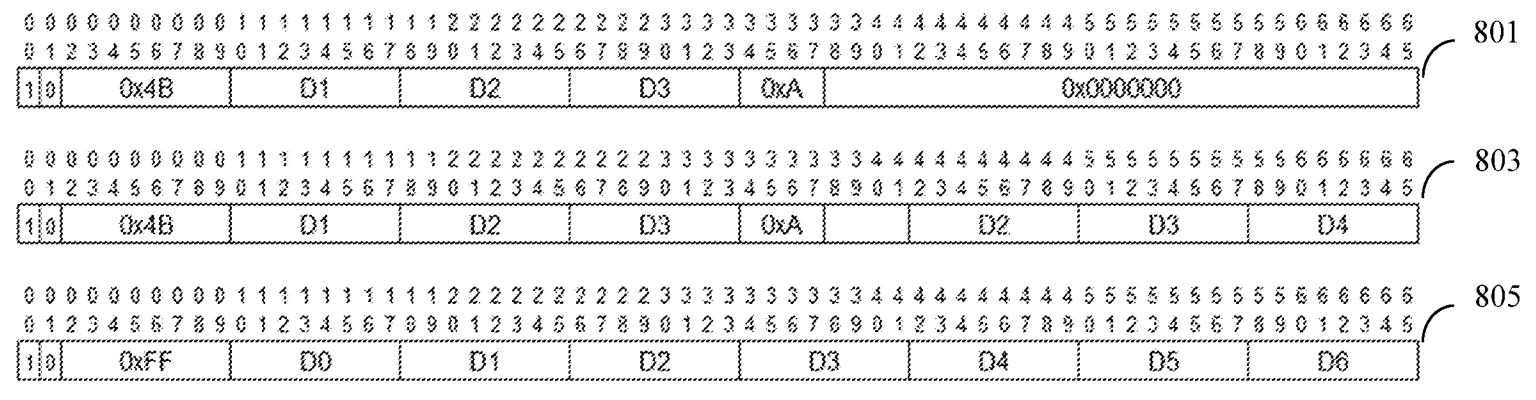

A quantity mark k is inserted in to a start code block, and the start code block may be changed to a code block identified by using a preset pattern. FIG. 7 is a schematic diagram of formats of six code blocks according to an embodiment of the present invention. For example, on the basis of the start code block shown in FIG. 6, for a code block 701, "0x55" of D1 is changed to "0x00", and "0xD5" of D7 is changed to "0xFF". For a code block 703, D1 is changed to "0xA". For a code block 705, D7 is changed to "0xAA". For a code block 707, D7 is changed to "0xA". For a code block 709, D1 is changed to "0xAA", and D7 is changed to "0xAA". For a code block 711, D1 is changed to "0xA", and D7 is changed to "0xA". D2, D3, D4, D5, and D6 in the six code blocks may be used to carry the quantity mark k. Another code block format may be further used. FIG. 8 is a schematic diagram of formats of three code blocks according to an embodiment of the present invention. Code block formats of code blocks 801 and 803 are identified by using a preset pattern "0x4B+0xA". For a code block 805, a control code block type "0x78" is changed to "0xFF". A specific implementation is not limited to the code block formats shown in FIG. 7 and FIG. 8, provided that a start code block carrying k can be identified.

Figure 9:
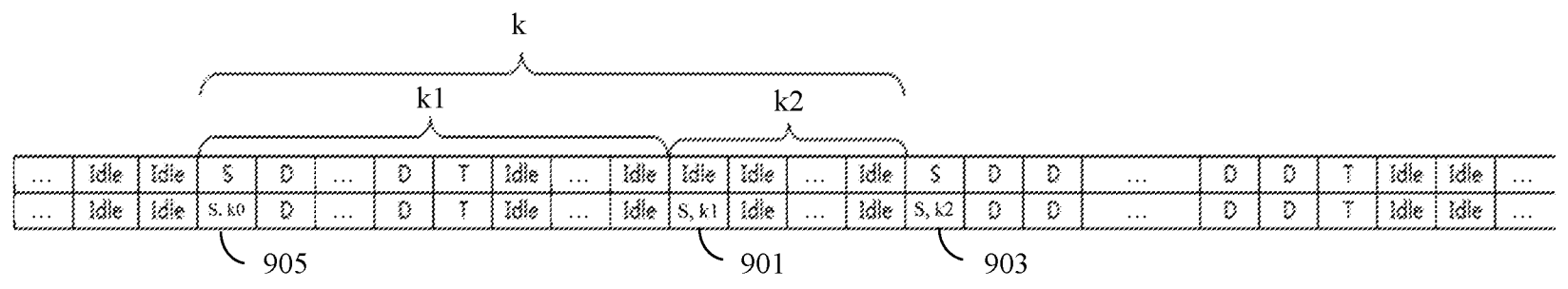

To reduce a processing delay, and save cache space, segment division may be further performed on the basis of FIG. 5. FIG. 9 is a schematic diagram of a format of a data stream according to an embodiment of the present invention. As shown in FIG. 9, a data stream whose length is k is divided into two segments whose lengths are k1 and k2. A quantity mark k1 may be inserted into the first code block 901 (an idle code block) following the segment k1, and is used to identify a quantity of all code blocks or a quantity of idle code blocks in the segment k1. A quantity mark k2 is inserted into the first code block 903 (a start code block) following the segment k2, and is used to identify a quantity of all code blocks or a quantity of idle code blocks in the segment k2. When the quantity marks k1 and k2 are respectively inserted into the idle code block and the start code block, the idle code block and the start code block may be changed to code blocks identified by using a preset pattern. For details, refer to the embodiments shown in FIG. 7 and FIG. 8. Details are not described herein again. Optionally, the idle code block 901 carrying k1 and the start code block 903 carrying k2 may be identified by using different preset patterns, so that a receive end device rapidly recovers an original code block. The start code block and a termination code block usually appear in pairs, to meet a pairing relationship between a character "/S/" in the start code block and a character "/T/" in the termination code block. The idle code block into which the quantity mark k1 is inserted may be considered as a start code block of a group. Optionally, any idle code block following the code block carrying k1 may be set as a termination code block. The figure further shows a start code block 905 into which a quantity mark k0 is inserted, and a function of the start code block 905 is similar to that of the start code block 901 carrying k1 and that of the start code block 903 carrying k2. Details are not described herein.

Figure 10:
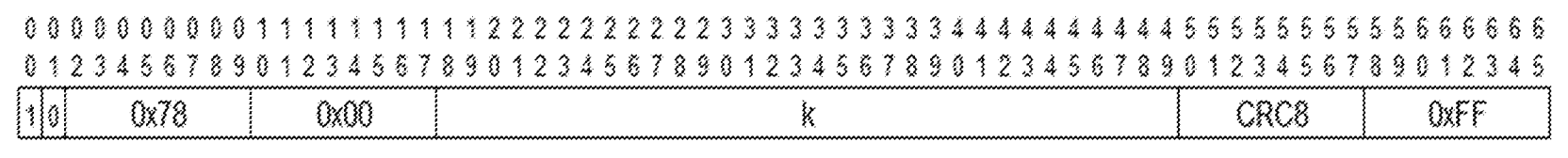

To ensure reliability of quantity marks k, k1, k2, and the like, check may be further performed on fields such as the quantity marks k, k1, and k2. FIG. 10 is a schematic diagram of a format of a code block according to an embodiment of the present invention. A cyclic redundancy check (CRC) check bit is set for the quantity mark k, for example, CRC8, so that a receive end device performs verification on transport reliability.

A quantity mark may be inserted into all start code blocks or some start code blocks in an original data stream. Inserting the quantity mark into the start code block or an idle code block is actually replacing the start code block or the idle code block with a code block carrying the quantity mark. The start code block or the idle code block may be first changed to a code block identified by using a preset pattern, and then, the quantity mark is inserted into the code block identified by using the preset pattern. Alternatively, the quantity mark is first inserted into the start code block or the idle code block, and then, the start code block or the idle code block into which the quantity mark is inserted is changed to a code block identified by using a preset pattern. Alternatively, a code block that is identified by using a preset pattern and that carries the quantity mark is directly inserted into a location of the start code block or the idle code block. This is not limited in the present invention.

The data format existing when encoding is not performed is described by using a data format in which insertion or deletion is performed at a granularity of four bytes.

Figure 11:
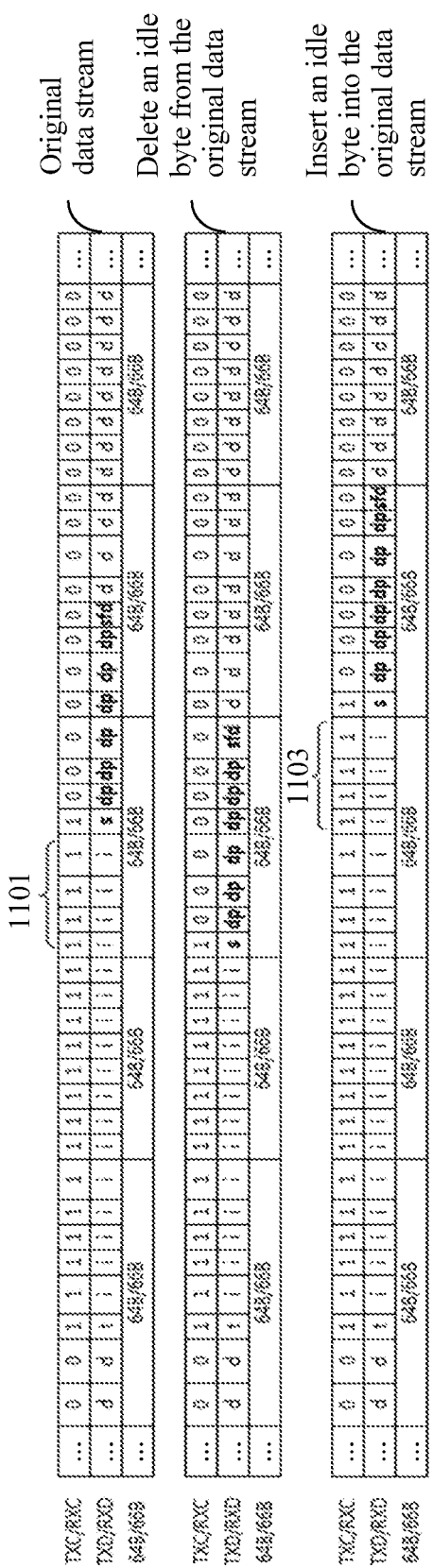
FIG. 11 is a schematic diagram of a format of a data stream according to an embodiment of the present invention.

For the data format existing when encoding is not performed, an idle unit may include a plurality of idle bytes. For example, idle-byte insertion or deletion may be performed at a granularity of an idle unit including four bytes or eight bytes. Because eight bytes may be corresponding to one 64b/66b code block, a processing manner of the data format existing when encoding is not performed is similar to a processing manner of the data format existing after encoding. FIG. 11 is a schematic diagram of a format of a data stream according to an embodiment of the present invention. As shown in FIG. 11, an MII byte data stream <TXC/RXC, TXD/RXD> is in a one-to-one correspondence with a 64b/66b code block. For example, eight idle bytes "/i/" are corresponding to one idle code block, eight data bytes "/d/" are corresponding to one data code block, and eight bytes that use a start-of-frame control character "/S/" as a start location are corresponding to one start code block. FIG. 11 shows three cases. In a first case, in an original data stream, a start-of-frame control character "/S/" is corresponding to the fifth location in a 64b/66b code block. In a second case, four idle bytes 1101 are deleted from the original data stream, and the start-of-frame control character "/S/" is corresponding to the first location in a 64b/66b code block. In a third case, four idle bytes 1103 are inserted into the original data stream, and the start-of-frame control character "/S/" is corresponding to the first location in a 64b/66b code block.

Figure 12:
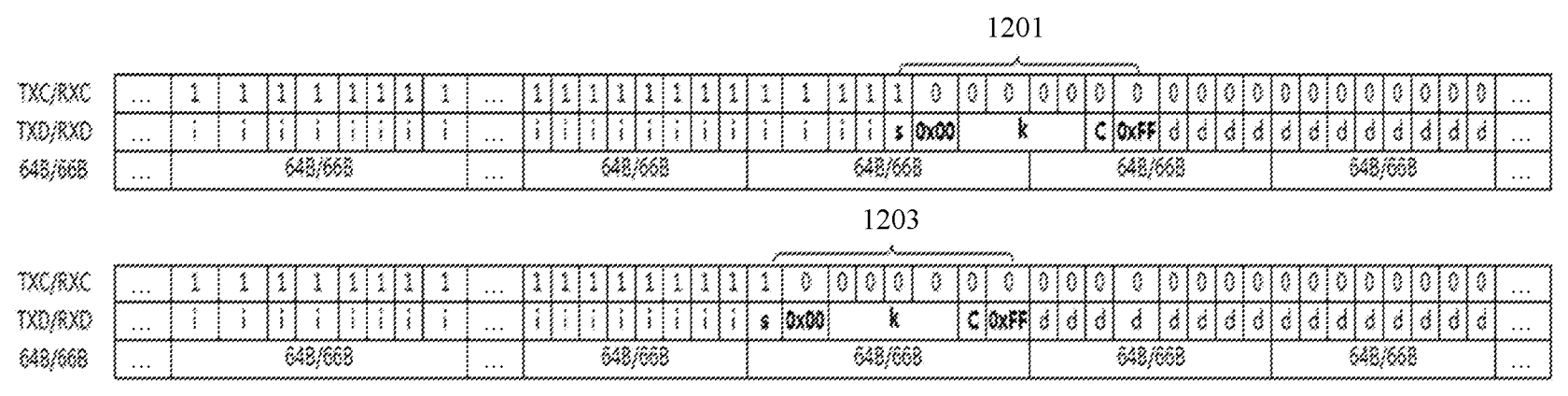

FIG. 12 is a schematic diagram of a format of a data stream according to an embodiment of the present invention. As shown in FIG. 12, a quantity mark k is inserted into an original data stream. The quantity mark k may be used to identify a quantity on the basis of per byte, or may be used to identify a quantity on the basis of per four bytes, or may be used to identify a quantity on the basis of per eight bytes. In FIG. 12, the quantity mark k is inserted into eight-byte units 1201 and 1203 (referred to as a preamble-element byte unit) in which a start-of-frame control character "/S/" is located and that are in the original data stream. That is, the quantity mark k may be used to identify a quantity of data bytes or a quantity of idle bytes in a segment of data stream prior to the preamble-element byte unit. In FIG. 12, the start-of-frame control character "/S/" of the eight-byte unit 1201 is corresponding to the fifth location in a 64b/66b code block, and the start-of-frame control character "/S/" of the eight-byte unit 1203 is corresponding to the first location in a 64b/66b code block. In addition, the eight-byte unit carrying k may be identified by using a preset byte such as "0x00" and "0xFF". Optionally, the field k may be further checked by using a C field (CRC).

Figure 13:
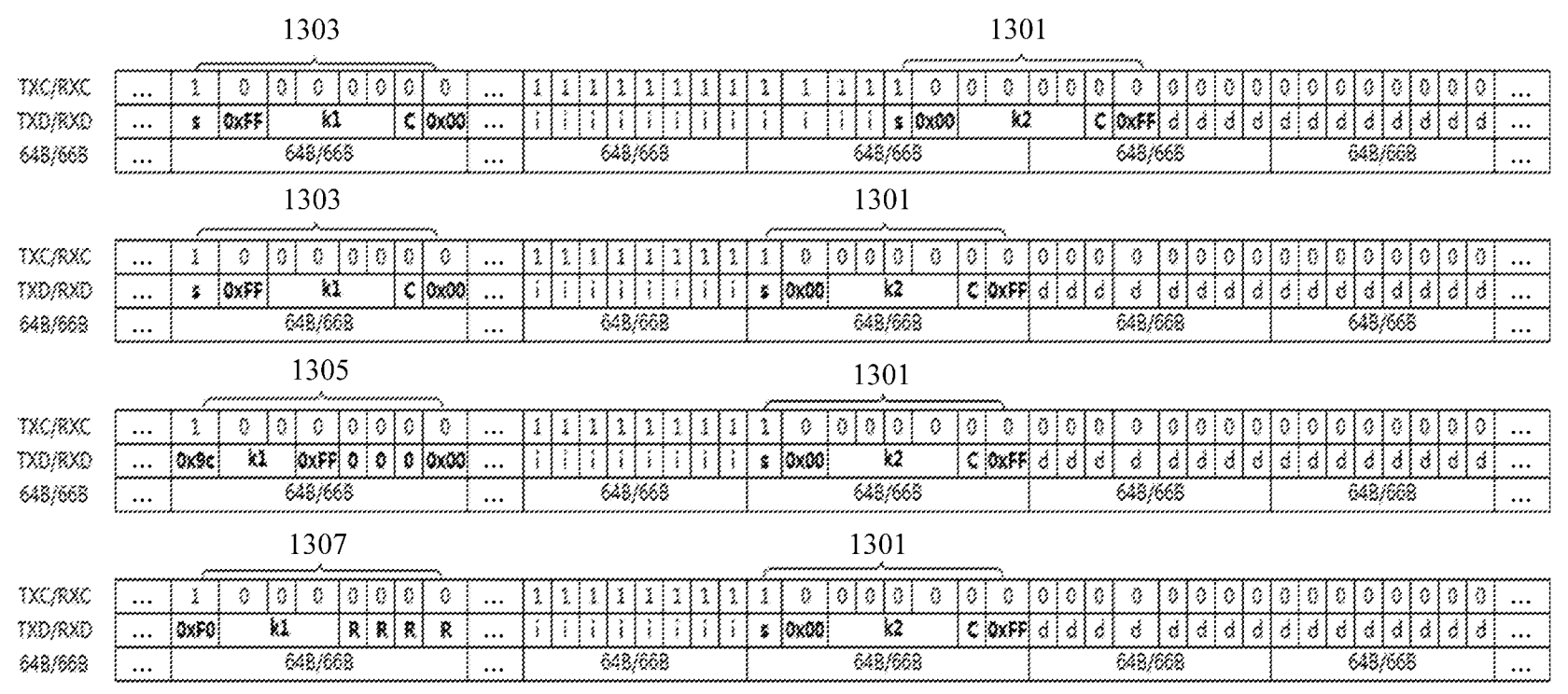

To reduce a processing delay, and save cache space, a data stream whose length is k may be further divided into segments on the basis of FIG. 12, for example, divided into two segments of data streams whose lengths are k1 and k2. FIG. 13 is a schematic diagram of another format of a data stream according to an embodiment of the present invention. A quantity mark k1 may be inserted into the first eight-byte unit 1303 (an idle byte unit) following the segment k1, and is used to identify a quantity of all data bytes or a quantity of idle bytes in the segment k1. A quantity mark k2 may be inserted into the first eight-byte unit 1301 (a preamble-element byte unit) following the segment k2, and is used to identify a quantity of all data bytes or a quantity of idle bytes in the segment k2. As shown in FIG. 13, a start control character "/S/" may be corresponding to the first location or the fifth location in a 64b/66b code block. The eight-byte unit carrying k1 may be identified by using a preset byte, for example, "0xFF" and "0x00" in the eight-byte unit 1303, "0x9C" in an eight-byte unit 135, and "0xF0" in an eight-byte unit 1307. The eight-byte unit 1301 carrying k2 may be identified by using a preset byte such as "0x00" and "0xFF". Optionally, the idle byte unit carrying k1 and the preamble-element byte unit carrying k2 may be identified by using different preset bytes, so that a receive end device rapidly recovers an original eight-byte unit. Optionally, the fields k1 and k2 may be further checked by using a C field (CRC).

A quantity mark may be inserted into all preamble-element byte units or some preamble-element byte units in the original data stream. Inserting the quantity mark into the preamble-element byte unit or an idle byte unit is actually replacing the preamble-element byte unit or the idle byte unit with a unit carrying the quantity mark. A preset byte may be first inserted into the preamble-element byte unit or the idle byte unit, and then, the quantity mark is inserted into the unit identified by using the preset byte. Alternatively, the quantity mark is first inserted into the preamble-element byte unit or the idle byte unit, and then, a preset byte is inserted into the preamble-element byte unit or the idle byte unit into which the quantity mark is inserted. Alternatively, a unit carrying the quantity mark and a preset byte may be directly inserted into a location of the preamble-element byte unit or the idle byte unit. This is not limited in the present invention.

Figure 14:
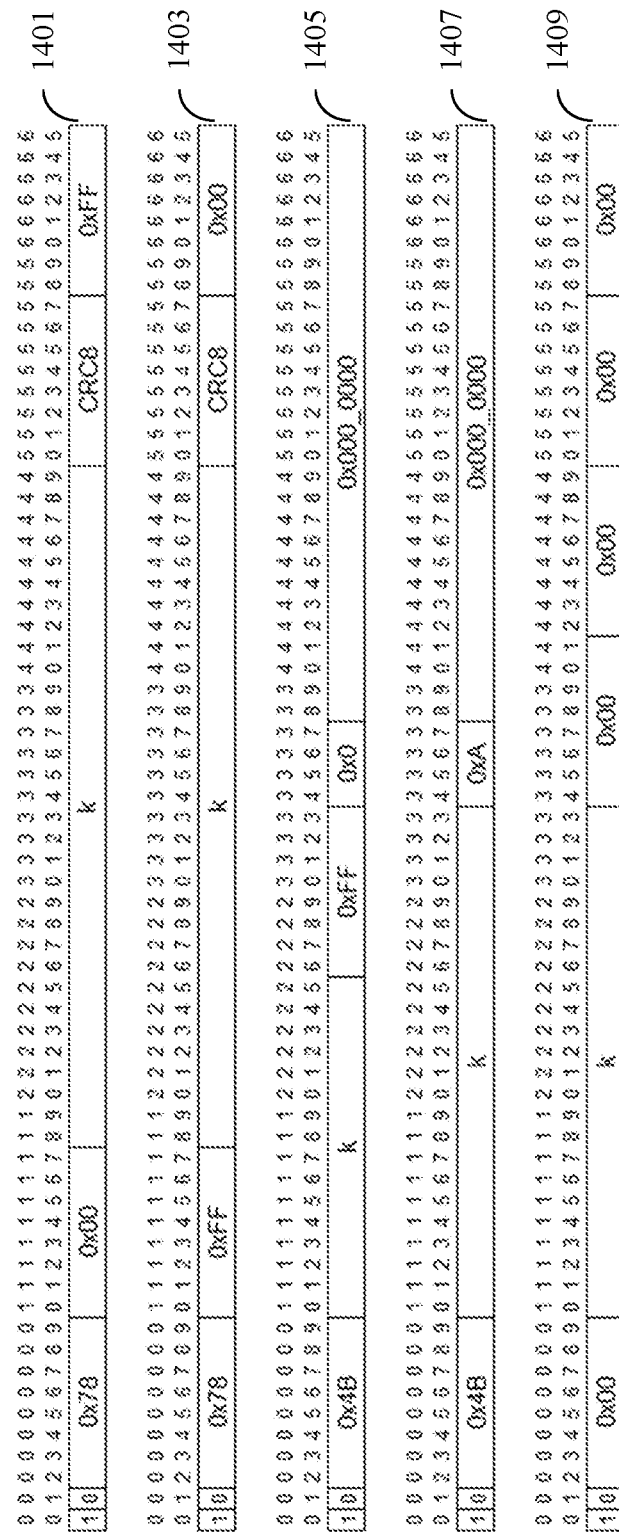
FIG. 14 is a schematic diagram of formats of five code blocks according to an embodiment of the present invention.

There is a correspondence between an 8-byte MII byte data stream and a 64b/66b code block. Therefore, eight-byte units carrying k, k1, and k2 may be corresponding to five code block formats shown in FIG. 14. As shown in FIG. 14, the eight-byte units 1201 and 1203 in FIG. 12 and the eight-byte unit 1301 in FIG. 13 may be corresponding to a code block 1401. The eight-byte unit 1303 in FIG. 13 may be corresponding to a code block 1403. The eight-byte unit 1305 in FIG. 13 may be corresponding to a code block 1405. The eight-byte unit 1307 in FIG. 13 is corresponding to a code block 1407 or a code block 1409.

It may be learned that the quantity marks k, k1, and k2 may be represented by using field lengths of 8 bits, 16 bits, 24 bits, 32 bits, and the like. When the length of 8 bits is used, a representation range includes 0 to 255; and when the length of 16 bits is used, a representation range includes 0 to 65535. By analogy, different bit lengths may be selected according to a length of a segment of data stream that is obtained by means of division.

In the embodiments of the present invention, the original data stream is divided into a plurality of segments of data streams, and a data unit, such as a start unit or an idle unit, into which a quantity mark can be inserted is found from each segment of data stream. The data unit into which the quantity mark is inserted may be located at a location adjacent to an identified segment of data stream, or may be located at a location that is not adjacent to an identified segment of data stream. The data unit into which the quantity mark is inserted may be located before an identified segment of data stream, or may be located after an identified segment of data stream. This is not limited in the present invention. In addition, the data unit into which the quantity mark is inserted may be used to identify a start location in a segment of data stream, or may be used to identify an end location in a segment of data stream. For example, any start code block may be used to identify a start location in a segment of data stream in which the start code block is located, or may be used to identify an end location in a previous segment of data stream.

Figure 15:
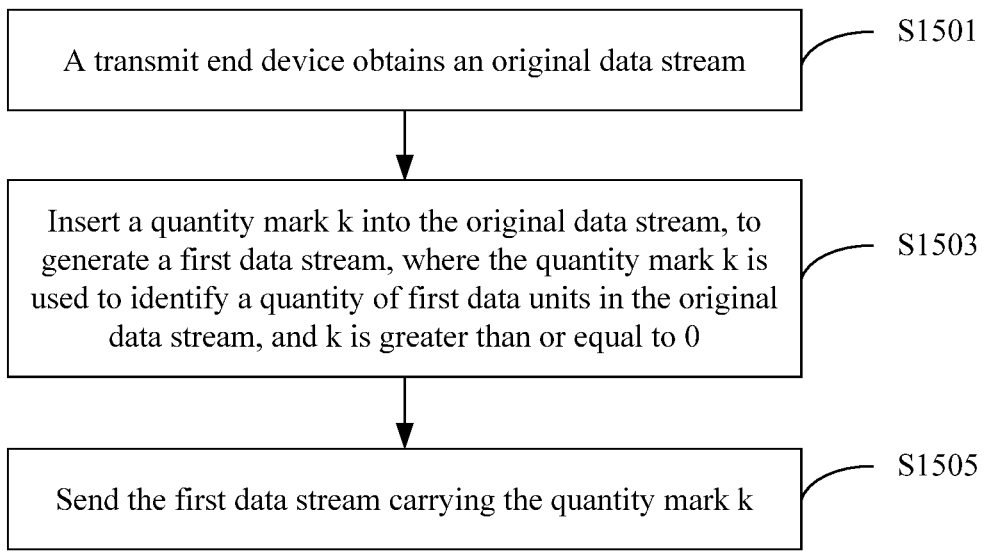

Referring to the principle of marking the quantity of idle units, the embodiments of the present invention are described below from a perspective of a processing procedure. FIG. 15 is an example flowchart of a method for sending a service according to an embodiment of the present invention. As shown in FIG. 15, the method may be executed by a transmit end device in the flexible Ethernet, and include the following steps.

S1501. The transmit end device obtains an original data stream.

In this embodiment of the present invention, the original data stream may be a service data stream including an interpacket gap (IPG), for example, an Ethernet packet service data stream. The IPG may be an idle unit, and has a plurality of data formats, for example, an idle packet at or above a media access control (MAC) layer, an MII idle byte unit, and an idle code block having a physical layer encoding format. An encoding format of an idle code block is, for example, 64b/66b encoding, 8b/10b encoding, or 512b/514b encoding.

S1503. Insert a quantity mark k into the original data stream, to generate a first data stream, where the quantity mark k is used to identify a quantity of first data units in the original data stream, and k is greater than or equal to 0.

For example, the first data unit may be all data units in the original data stream, or may be an idle unit in the original data stream. When the quantity mark k is used to identify a quantity of all data units in the original data stream, k may be an integer greater than 0. When the quantity mark k is used to identify a quantity of idle units in the original data stream, k may be an integer greater than or equal to 0.

S1505. Send the first data stream carrying the quantity mark k.

In this embodiment of the present invention, a 40 GE service and a 10 GE service that are borne by the flexible Ethernet are mainly used as an example for description. A processing procedure of a 100 GE service or an over 100 GE service is similar to a processing procedure of the 40 GE service, and a processing procedure of a 25 GE service is similar to a processing procedure of the 10 GE service.

40 GE Service

Figure 16:
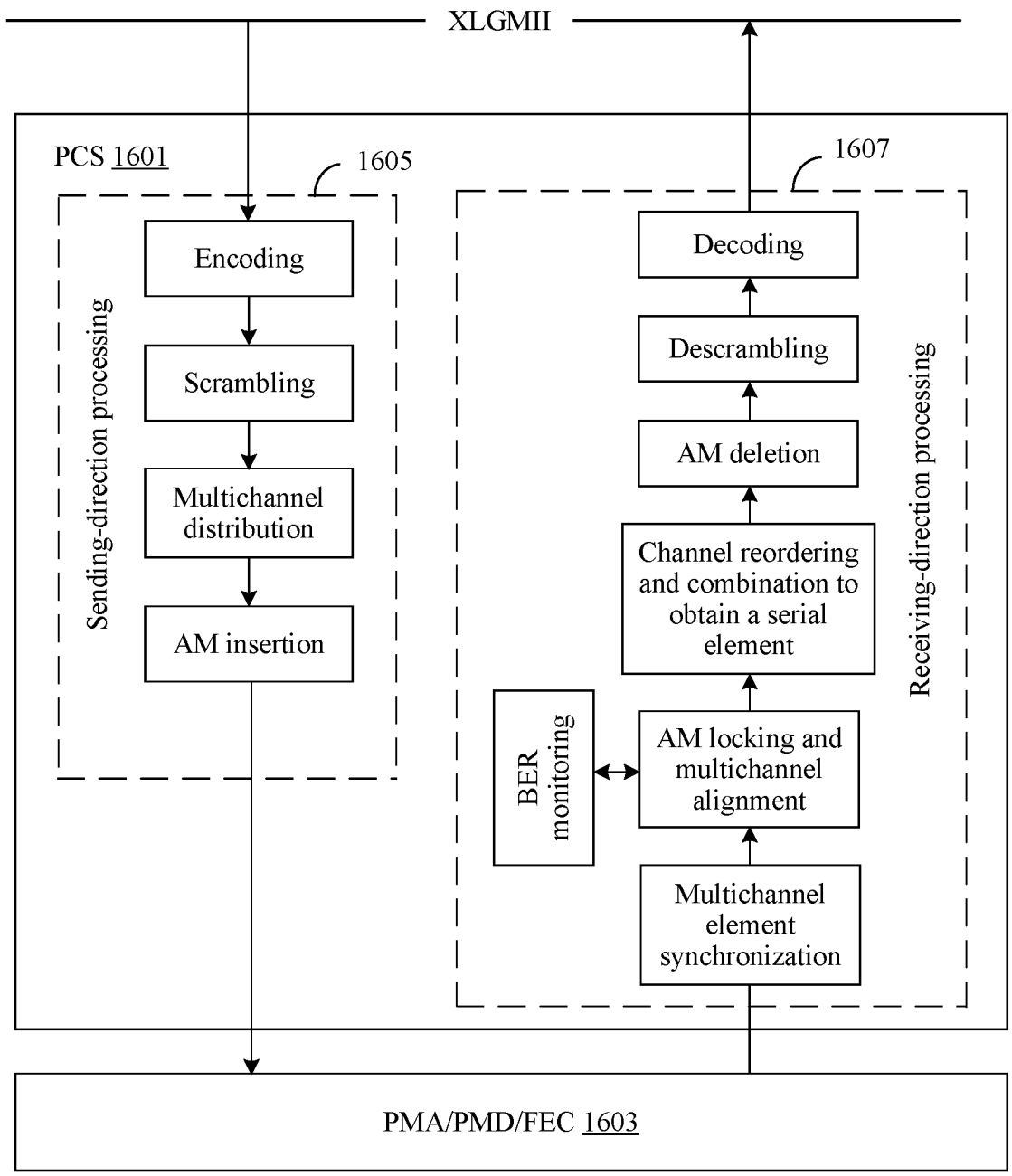
FIG. 16 is a schematic diagram of a data processing procedure of a 4 GE physical interface according to an embodiment of the present invention.

To describe the technical solutions in this embodiment of the present invention more clearly, first, a 40 GE physical interface is briefly described. An MII of the 4 GE physical interface is referred to as 40 Gbps media independent interface (XLGMII). The XLGMII inherits a clock frequency and a time phase that are corresponding to the 4 GE physical interface, and a nominal rate is 40 Gbps/64* (16383/16384)=625*(16383/16384) MHz. FIG. 16 is a schematic diagram of a data processing procedure of a 4 GE physical interface according to an embodiment of the present invention. As shown in FIG. 16, a physical layer structure of the 40 GE physical interface includes a physical coding sublayer (PCS) 1601, and further includes any one or more of the following sublayers: a physical medium attachment (PMA) sublayer, a physical medium dependent (PMD) sublayer, or forward error correction (FEC) 1603. The physical layer structure of the 40 GE physical interface further includes a reconciliation sublayer (RS) (which is not shown in the figure). The XLGMII interface is located between the RS and the PCS. Sending-direction processing 1605 of the PCS may include encoding, scrambling, multichannel distribution, an alignment code block (AM) insertion, and the like. Receiving-direction processing 1607 of the PCS may include multichannel element synchronization, AM locking and channel alignment, bit error rate (BER) monitoring, channel reordering and combination to obtain a serial element, AM deletion, descrambling, decoding, and the like. For the processing steps shown in FIG. 16, refer to the prior art. In the sending direction 1605, after receiving a data stream from the XLGMII interface, the PCS needs to distribute the data stream to a plurality of channels (multichannel distribution), and insert an AM (AM insertion) into each channel. In the receiving direction 1607, before sending the data stream to the XLGMII interface, the PCS receives data streams from a plurality of channels, performs alignment and reordering on the data streams on the plurality of channels, to recover a serial data stream (multichannel element synchronization, AM locking and channel alignment, and channel reordering and combination to obtain a serial element), deletes the AM of each channel (AM deletion), and performs descrambling and decoding.

Figure 17:
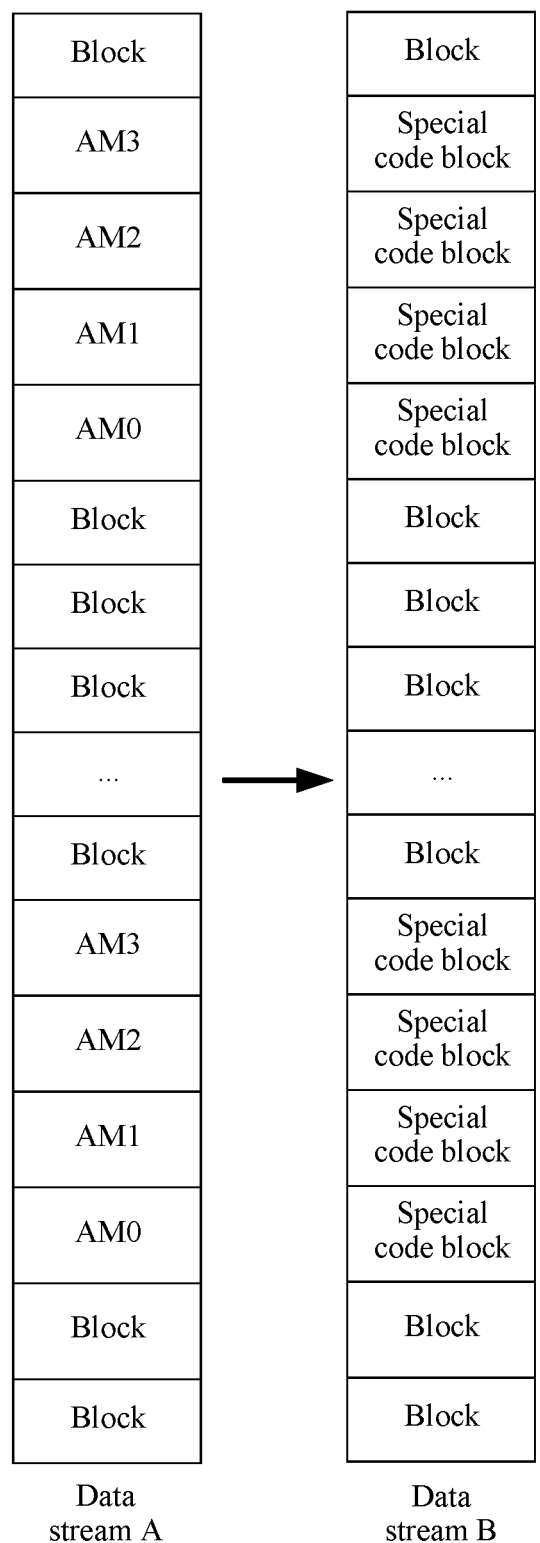
FIG. 17 is a schematic diagram of AM format conversion according to an embodiment of the present invention.
Figure 18:
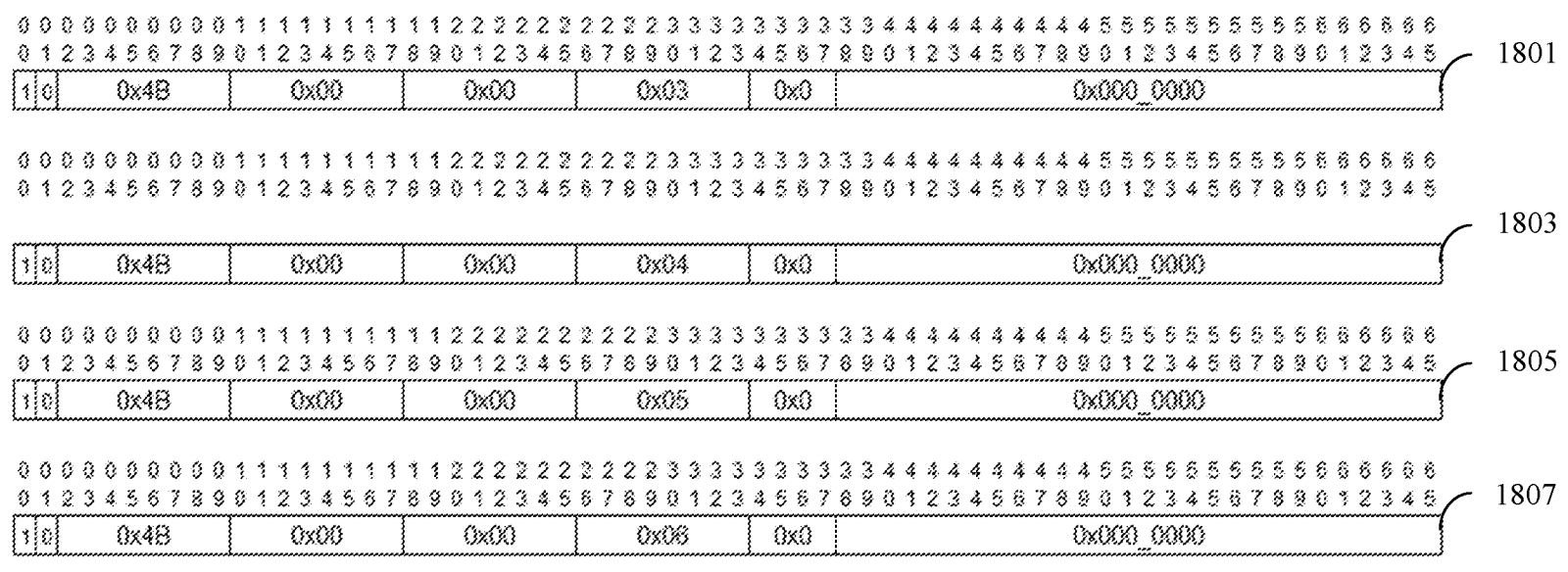

If the original data stream may be received from the 4 GE physical interface, step S1503 may be performed after the descrambling in the receiving-direction processing 1607 of the 40 GE physical interface, or may be performed before or after the decoding. This embodiment of the present invention may be implemented based on the data processing procedure shown in FIG. 16, but is not limited to the example shown in FIG. 16. For example, the data processing procedure may not include the AM deletion step. If the AM is not deleted, when the quantity mark k is inserted, the AM further needs to be used as a data unit in the original data stream for statistics collection. FIG. 17 is a schematic diagram of AM format conversion according to an embodiment of the present invention. As shown in FIG. 17, after the AM locking and multichannel alignment, an AM code block (such as AM0, AM1, AM2, or AM3) in a data stream A may be replaced with a special code block in a data stream B. FIG. 18 is a schematic diagram of formats of four code blocks according to an embodiment of the present invention. As shown in FIG. 18, AM0, AM1, AM2, and AM3 are respectively replaced with code blocks 1801, 1803, 1805, and 1807. Alternatively, AM0, AM1, AM2, and AM3 may be replaced with four same code blocks, for example, any one of the foregoing four code blocks.

Figure 19:
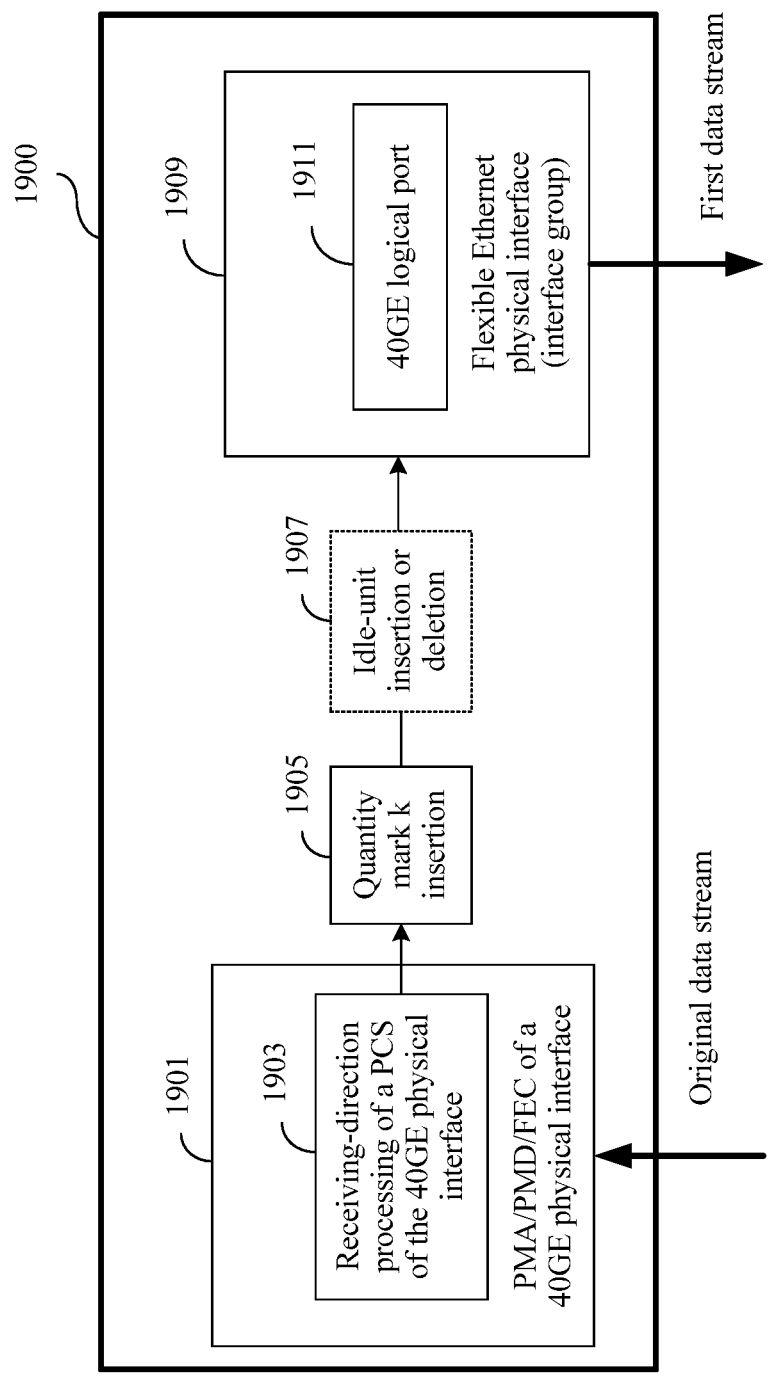
FIG. 19 is a schematic structural diagram of a transmit end device according to an embodiment of the present invention.

FIG. 19 is a schematic structural diagram of a transmit end device 1900 according to an embodiment of the present invention. As shown in FIG. 19, the transmit end device 1900 receives the original data stream from PMA/PMD/FEC 1901 of a 40 GE physical interface. For receiving-direction processing 1903 of a PCS of the 40 GE physical interface, refer to the receiving-direction processing 1607 shown in FIG. 16. The receiving-direction processing 1903 of the PCS may be implemented by using a physical circuit, or may be implemented by using a logic circuit, or may be implemented by using hardware, software, or a combination of hardware and software. Quantity mark k insertion 1905 may be implemented during the receiving-direction processing 1903 of the PCS, or may be implemented after the receiving-direction processing 1903 of the PCS. Optionally, after the quantity mark k insertion 1905, idle-unit insertion or deletion 1907 may be performed for rate adaption. For idle-unit insertion or deletion for rate adaption, refer to the prior art. Then, the first data stream into which the quantity mark k is inserted may be sent by using a 4 GE logical port 1911 formed by a flexible Ethernet physical interface (or an interface group) 1909.

10 GE Service

Figure 20:
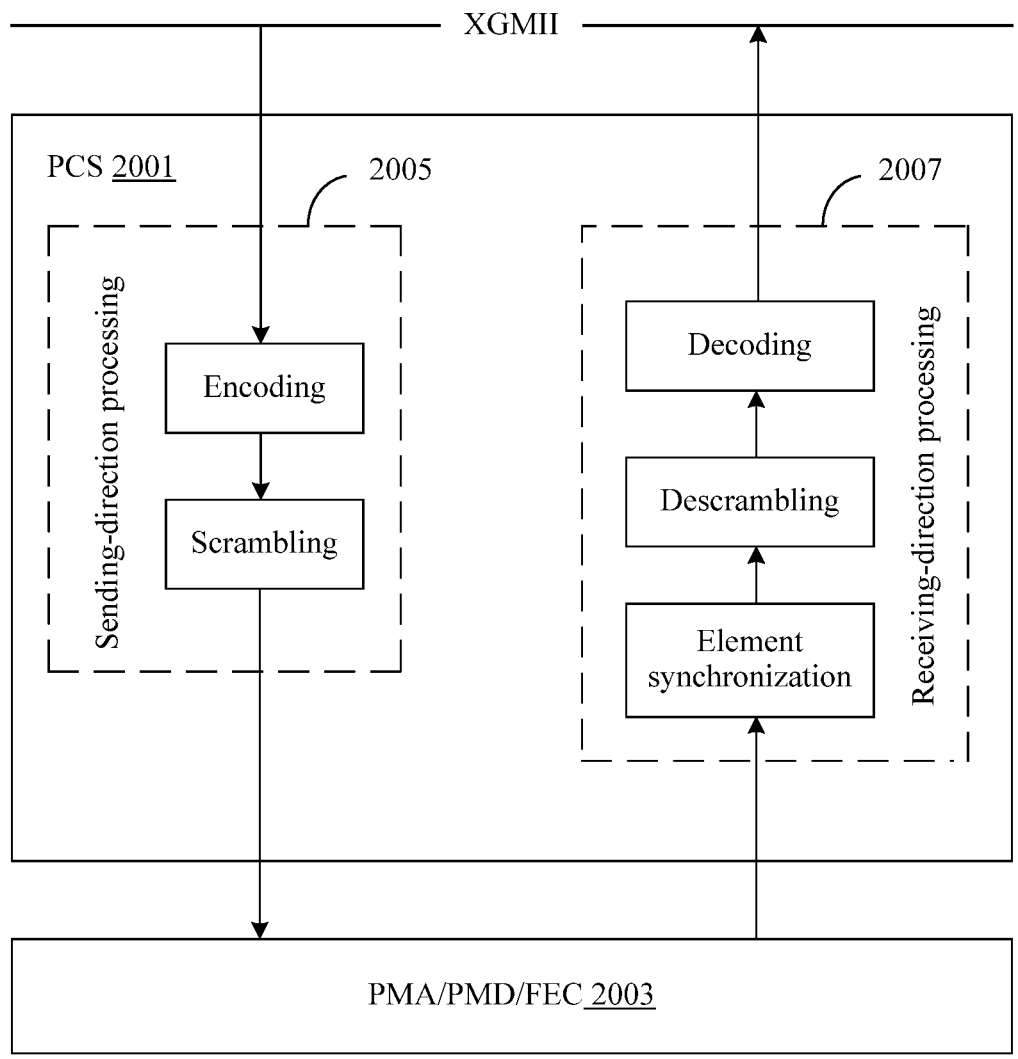
FIG. 20 is a schematic diagram of a data processing procedure of a 10 GE physical interface according to an embodiment of the present invention.

FIG. 20 is a schematic diagram of a data processing procedure of a 10 GE physical interface according to an embodiment of the present invention. An MII of the 10 GE physical interface is referred to as an XGMII, the XGMII uses a data bit width of 32 bits, and a start-of-frame control character is aligned with a boundary of four bytes, that is, the start-of-frame control character may be located at the fifth location or the first location in a 64b/66b code block. As shown in FIG. 20, a physical layer structure of the 10 GE physical interface is similar to that of the 40 GE physical interface, and includes a PCS 2001 and any one or more of the following sublayers: PMA, PMD, or FEC 2003. Sending-direction processing 2005 of the PCS may include encoding and scrambling. Receiving-direction processing 2007 of the PCS may include element synchronization, descrambling, and decoding. In the current flexible Ethernet, because time division multiplexing (TDM) is performed according to a 64b/66b code block based on a 100 GE physical interface, to obtain a logical port by means of division, code block type conversion needs to be performed on the 10 GE service. That is, in a receiving direction 2007 of the PCS, decoding (for example, 64b/66b decoding) is first performed, and then, idle-byte insertion or deletion is performed based on a decoded MII byte data stream. For example, if the start-of-frame control character is located at the fifth location of a 64b/66b code block, a data stream may be moved forwards or backwards by 4 bytes by means of idle-byte insertion or deletion, so that the start-of-frame control character is aligned with a boundary of the 64b/66b code block.

If the original data stream may be received from the 10 GE physical interface, step S1503 may be performed after or before the decoding in the receiving direction 2007 of the 10 GE physical interface. For example, this embodiment of the present invention may be implemented based on the data processing procedure shown in FIG. 20, but is not limited to the example shown in FIG. 20. For example, the data processing procedure may not include the decoding step, and in this case, S1503 may be performed after the descrambling.

Figure 21:
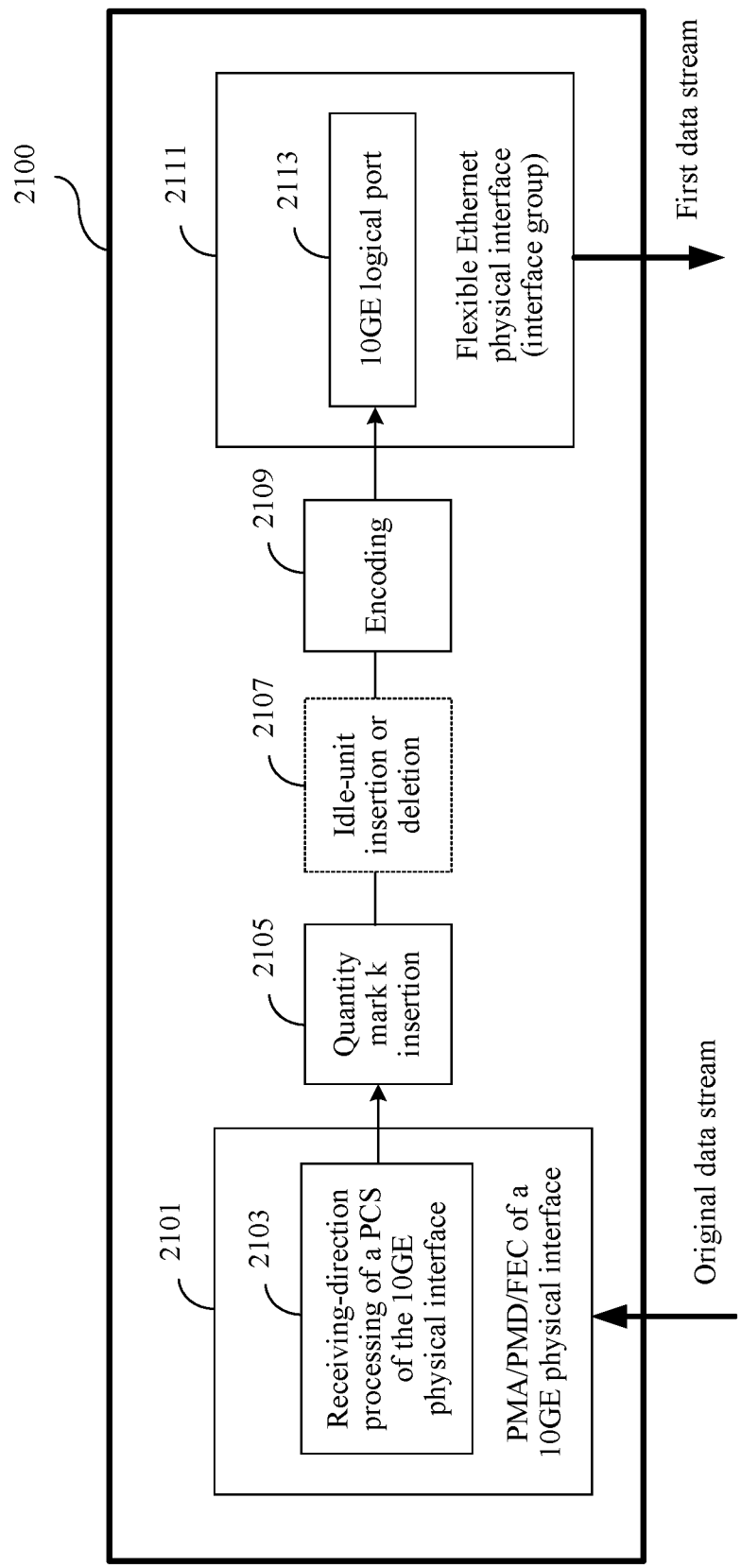
FIG. 21 is a schematic structural diagram of another transmit end device according to an embodiment of the present invention.

FIG. 21 is a schematic structural diagram of a transmit end device 2100 according to an embodiment of the present invention. As shown in FIG. 21, the transmit end device 2100 receives the original data stream from PMA/PMD/FEC 2101 of a 10 GE physical interface. For receiving-direction processing 2103 of a PCS of the 10 GE physical interface, refer to the receiving-direction processing 2007 shown in FIG. 20. The receiving-direction processing 2103 of the PCS may be implemented by using a physical circuit, or may be implemented by using a logic circuit, or may be implemented by using hardware, software, or a combination of hardware and software. Quantity mark k insertion 2105 may be implemented during the receiving-direction processing 2103 of the PCS, or may be implemented after the receiving-direction processing 2103 of the PCS. Optionally, after the quantity mark k insertion 2105, idle-unit insertion or deletion 2107 may be performed for rate adaption. Then, encoding 2109 is performed on the first data stream into which the quantity mark k is inserted, and the first data stream is sent by using a 10 GE logical port 2113 formed by a flexible Ethernet physical interface (or an interface group) 2111. Optionally, the quantity mark k insertion 2105 and idle-unit insertion or deletion 2107 may be performed before the encoding 2109, or may be performed after the encoding 2109. If there is no decoding in the receiving-direction processing of the PCS, no encoding needs to be performed herein.

Figure 22:
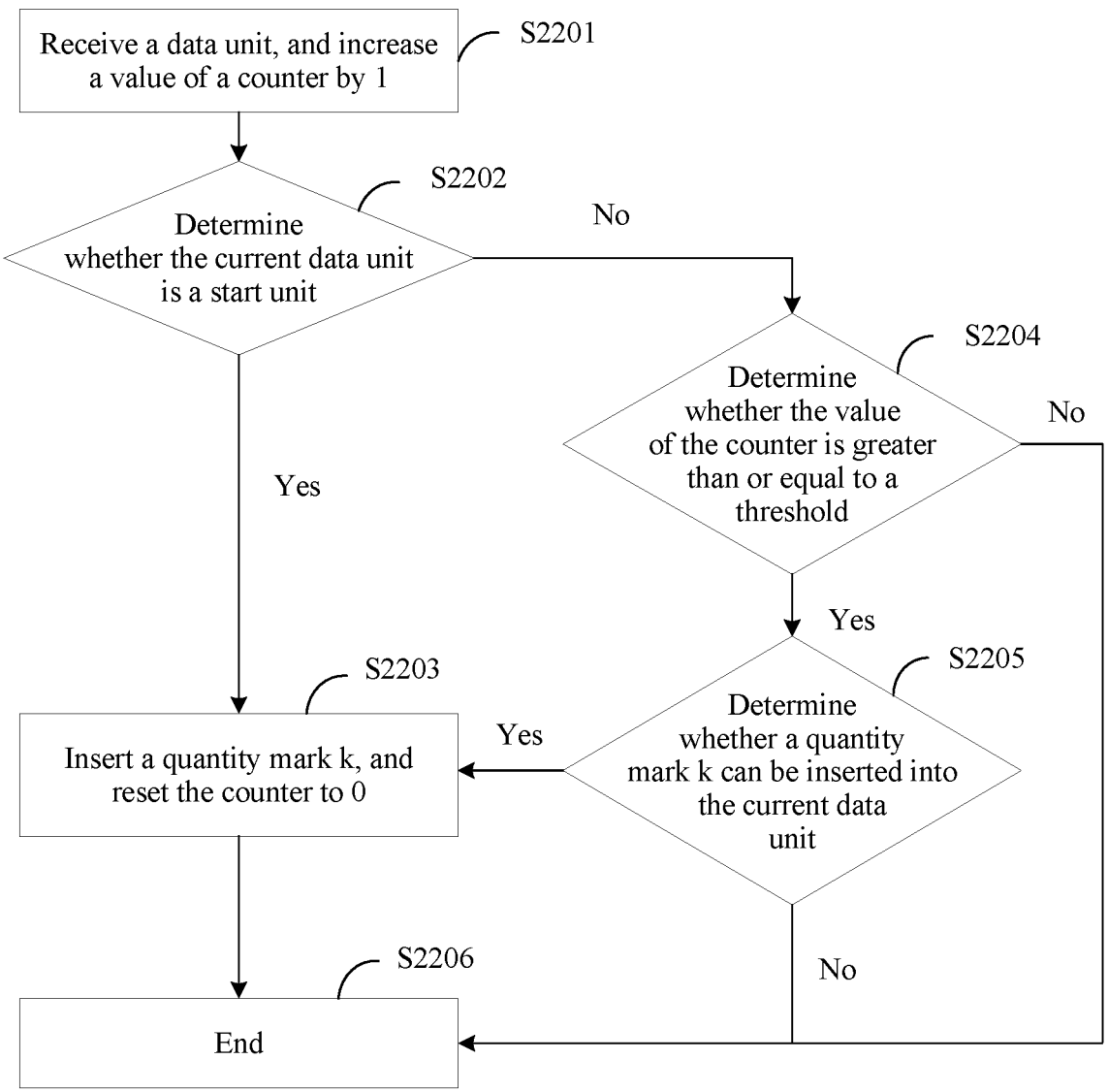
FIG. 22 is a flowchart of a quantity mark insertion method according to an embodiment of the present invention.

An example is used below to describe how to insert a quantity mark k. FIG. 22 is a flowchart of a quantity mark insertion method according to an embodiment of the present invention. As shown in FIG. 22, in S2201, a counter is set, and when a data unit is received from an original data stream, a value of the counter is increased by 1. A data format of the data unit may include a code block, a byte, or the like. For example, the data format of the data unit is a code block, a data unit in the original data stream may include a start code block S, a termination code block T, a code block D, and an idle code block (Idle), and may further include an AM code block, or the like. In S2202, if the current data unit is a start unit, for example, a start code block S, S2203 is performed, to insert a current value k (a quantity mark k) of the counter into the current data unit, that is, replace the current data unit with a data unit carrying k, and reset the counter to 0.

In S2202, if the current data unit is not a start unit, whether a quantity mark k can be inserted into the current data unit needs to be determined according to the value of the counter. In S2204, if the current value k of the counter is greater than or equal to a preset threshold, S2205 is performed, to determine whether the quantity mark k can be inserted into the current data unit. For example, if the current data unit is an idle unit, the quantity mark k may be inserted into the current idle unit. If the current data unit is not an idle unit, unit conversion may be performed on the current data unit, and then, the quantity mark k is inserted. For example, when the current data unit carries a command word such as a local fault (LF) or a remote fault (RF), the LF, the RF, or the like is carried by another idle code block, and the quantity mark k is inserted into a location of the current data unit. In S2205, if the quantity mark k cannot be inserted into the current data unit, S2206 is performed, to end the procedure, receive a next data unit in the original data stream, and determine whether the quantity mark k can be inserted into the next data unit. In S2204, if the current value k of the counter is less than a threshold, S2206 is performed, to end the procedure to continue to receive a next data unit of the original data stream.

For threshold setting of the value of the counter, refer to a bit length carrying the quantity mark k. A higher bit length indicates that a larger threshold may be set.

The quantity mark k may be inserted after the current data unit is replaced with a unit having a preset format. Alternatively, the quantity mark k may be inserted before the current data unit is replaced with a unit having a preset format. The quantity mark k may be directly inserted into a redundant field or an idle field in the current data unit. For how to insert the quantity mark k into a data unit, refer to the foregoing principle of marking the quantity of idle units. Details are not described herein.

In this embodiment of the present invention, the transmit end device adds the quantity mark k into the original data stream, and the quantity mark k is used to identify the quantity of data units or idle units in the original data stream. In this way, a receive end device can recover the original data stream according to the quantity mark k, to recover a clock frequency and time phase information of the original data stream, so that a clock frequency and time phase information of a service are transparently transported.

Figure 23:
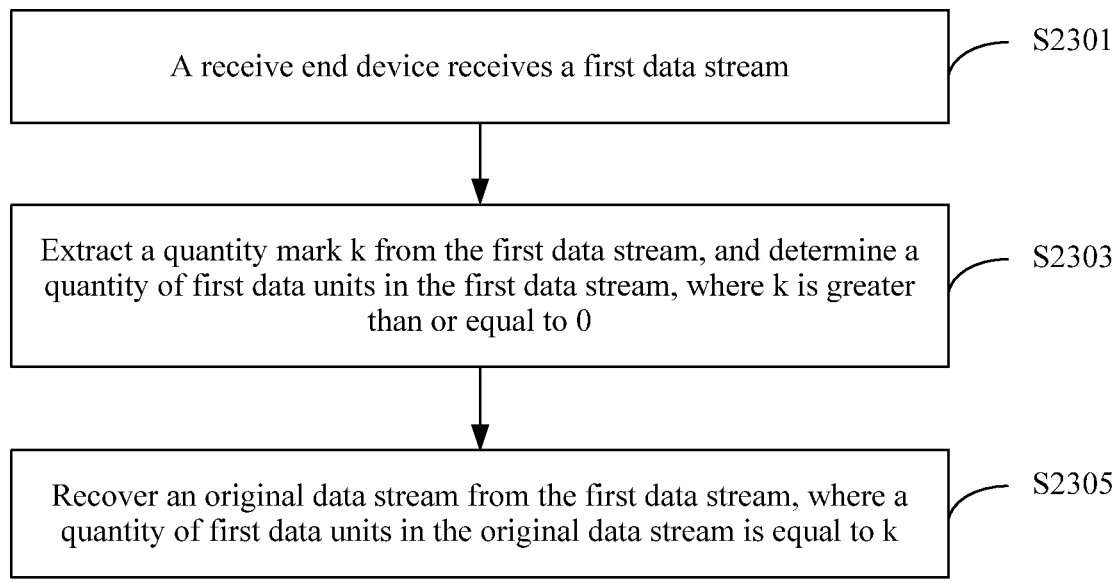
FIG. 23 is an example flowchart of a method for receiving a service according to an embodiment of the present invention.

FIG. 23 is an example flowchart of a method for receiving a service according to an embodiment of the present invention. As shown in FIG. 23, the method may be executed by a receive end device in the flexible Ethernet, and include the following steps.

S2301. The receive end device receives a first data stream.

Before the first data stream arrives at the receive end device, another device such as an intermediate device may perform idle-unit insertion or deletion, to adapt a difference between rates on a line. In this embodiment of the present invention, a data format of the first data stream may be the same as that of an original data stream, or may be different from that of an original data stream. For example, both the original data stream and the first data stream are data streams on which encoding is performed. Alternatively, the original data stream is a data stream on which encoding is not performed, and the first data stream is a data stream on which encoding is performed.

S2303. Extract a quantity mark k from the first data stream, and determine a quantity of first data units in the first data stream, where k is greater than or equal to 0.

For example, the first data unit may be all data units in the original data stream, or may be an idle unit in the original data stream. When the quantity mark k is used to identify a quantity of all data units in the original data stream, k may be an integer greater than 0. When the quantity mark k is used to identify a quantity of idle units in the original data stream, k may be an integer greater than or equal to 0.

S2305. Recover the original data stream from the first data stream, where a quantity of first data units in the original data stream is equal to k.

In this embodiment of the present invention, a 40 GE service and a 10 GE service that are borne by the flexible Ethernet are mainly used as an example for description. A processing procedure of a 100 GE service or an over 100 GE service is similar to a processing procedure of the 40 GE service, and a processing procedure of a 25 GE service is similar to a processing procedure of the 10 GE service.

40 GE Service

This embodiment of the present invention may be implemented based on the data processing procedure shown in FIG. 16, but is not limited to the example shown in FIG. 16. For example, the data processing procedure may not include the AM insertion step. If the first data stream may be received from a 40 GE logical interface, steps S2303 and S2305 may be performed before the scrambling in the sending-direction processing 1605 of the 4 GE physical interface, or may be performed before or after the encoding.

Figure 24:
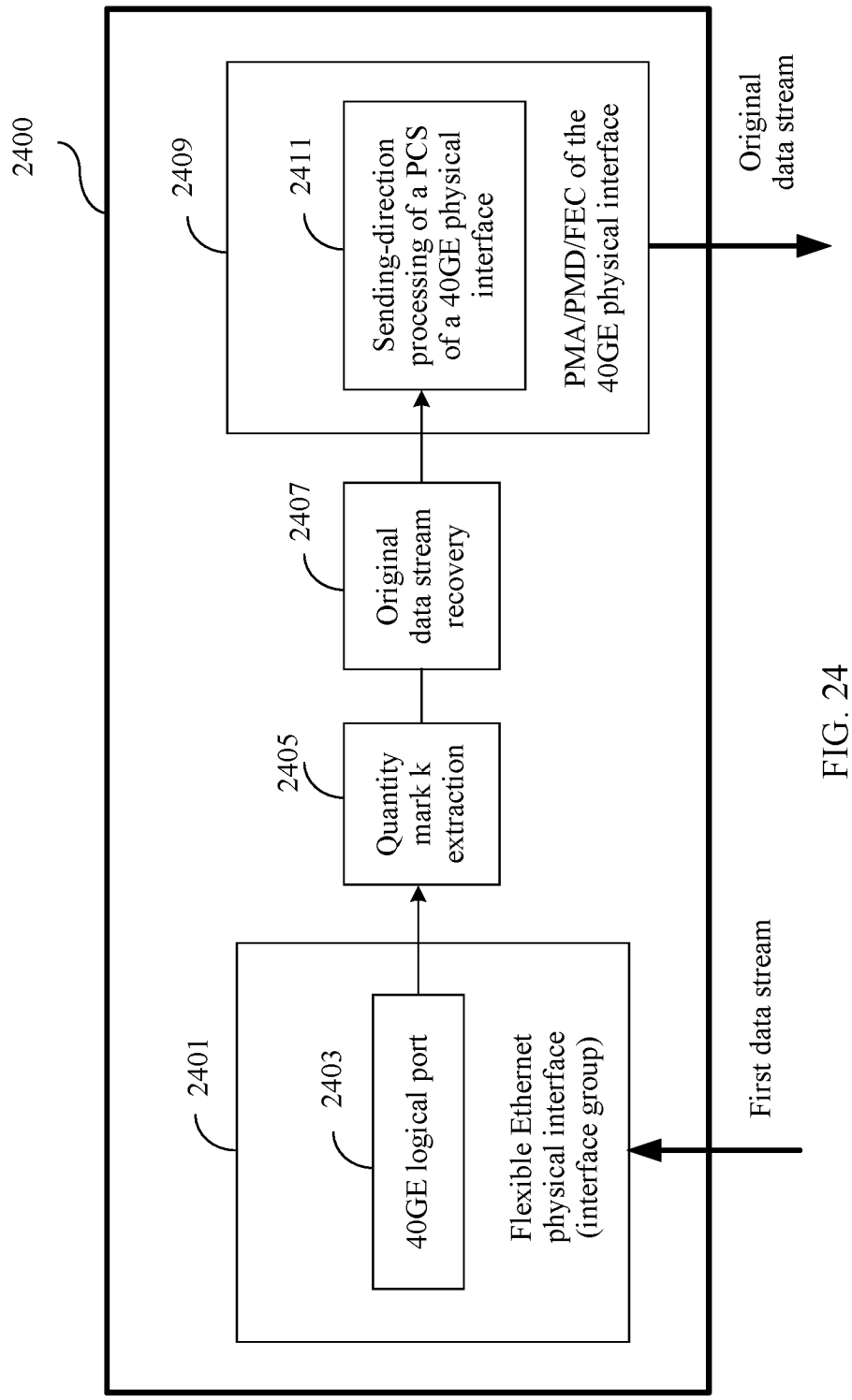
FIG. 24 is a schematic structural diagram of a receive end device according to an embodiment of the present invention.

FIG. 24 is a schematic structural diagram of a receive end device 2400 according to an embodiment of the present invention. As shown in FIG. 24, the receive end device 2400 receives the first data stream by using a 40 GE logical port 2403 formed by a flexible Ethernet physical interface (interface group) 2401, recovers the original data stream from the first data stream, and then, may send the recovered original data stream to a customer device by using PMA/PMD/FEC 2409 of a 40 GE physical interface. For sending-direction processing 2411 of a PCS of the 40 GE physical interface, refer to the sending-direction processing 165 shown in FIG. 16. The sending-direction processing 2411 of the PCS may be implemented by using a physical circuit, or may be implemented by using a logic circuit, or may be implemented by using hardware, software, or a combination of hardware and software. Quantity mark k extraction 2405 and original data recovery 2407 may be implemented during the sending-direction processing 2411 of the PCS, or may be implemented at the 40 GE logical port 2403, or may be independently implemented.

10 GE Service

This embodiment of the present invention may be implemented based on the data processing procedure shown in FIG. 20, but is not limited to the example shown in FIG. 20. For example, the data processing procedure may not include the encoding step. If the original data stream may be received from a 10 GE logical port, steps S2303 and S2305 may be performed after or before the encoding in the sending-direction processing 2005 of the 10 GE physical interface.

Figure 25:
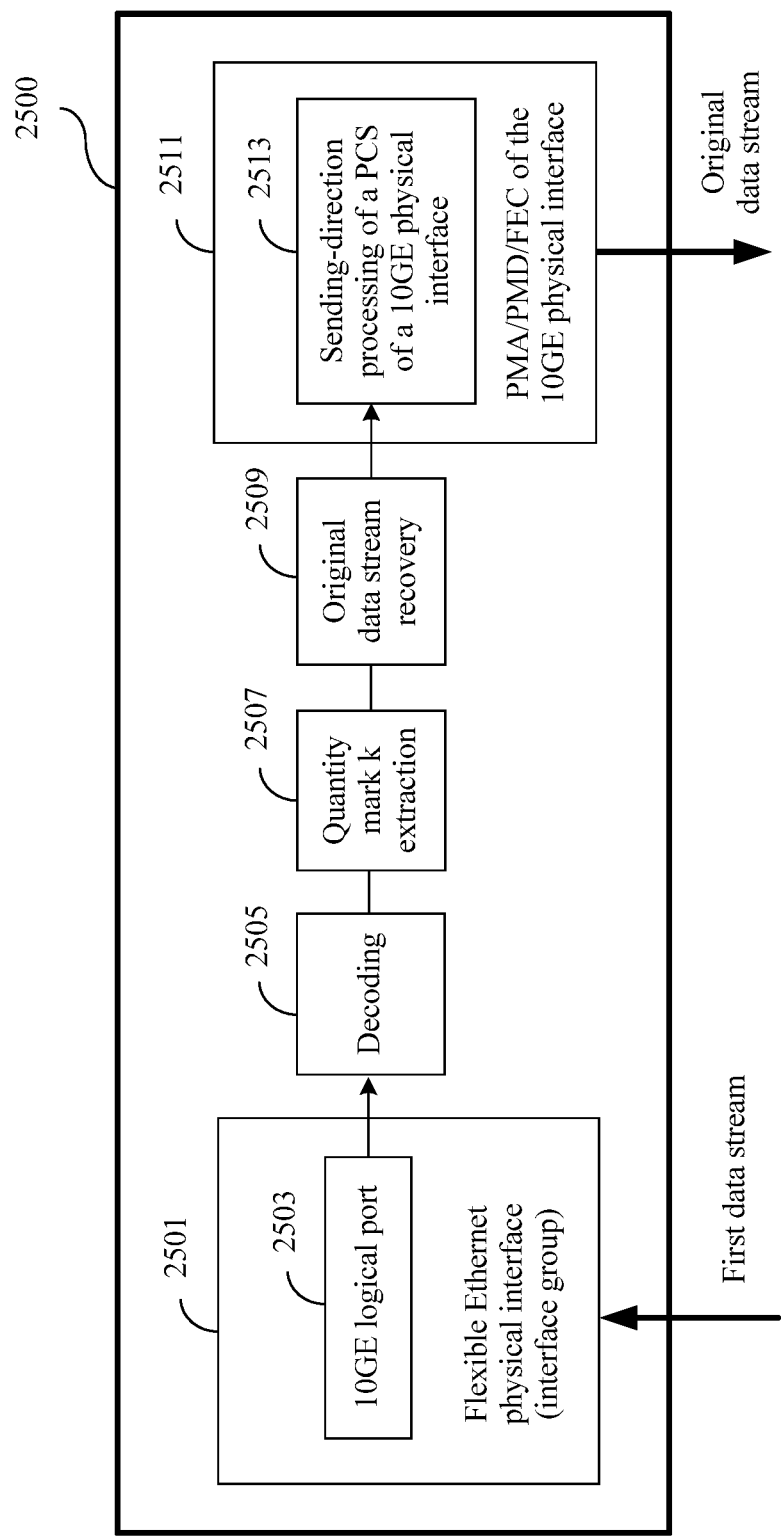
FIG. 25 is a schematic structural diagram of another receive end device according to an embodiment of the present invention.

FIG. 25 is a schematic structural diagram of a receive end device 2500 according to an embodiment of the present invention. As shown in FIG. 25, the receive end device 2500 receives the first data stream by using a 10 GE logical port 2503 formed by a flexible Ethernet physical interface (interface group) 2501, recovers the original data stream from the first data stream, and then, may send the recovered original data stream to a customer device by using PMA/PMD/FEC 2511 of a 10 GE physical interface. For sending-direction processing 2513 of a PCS of the 10 GE physical interface, refer to the sending-direction processing 2005 shown in FIG. 20. The sending-direction processing 2513 of the PCS may be implemented by using a physical circuit, or may be implemented by using a logic circuit, or may be implemented by using hardware, software, or a combination of hardware and software. Quantity mark k extraction 2507 and original data recovery 2509 may be implemented during the sending-direction processing 2513 of the PCS, or may be implemented at the 10 GE logical port 2503, or may be independently implemented. Optionally, the quantity mark k extraction 2507 and the original data recovery 2509 may be performed after decoding 2505, or may be performed before decoding 2505.

Figure 26:
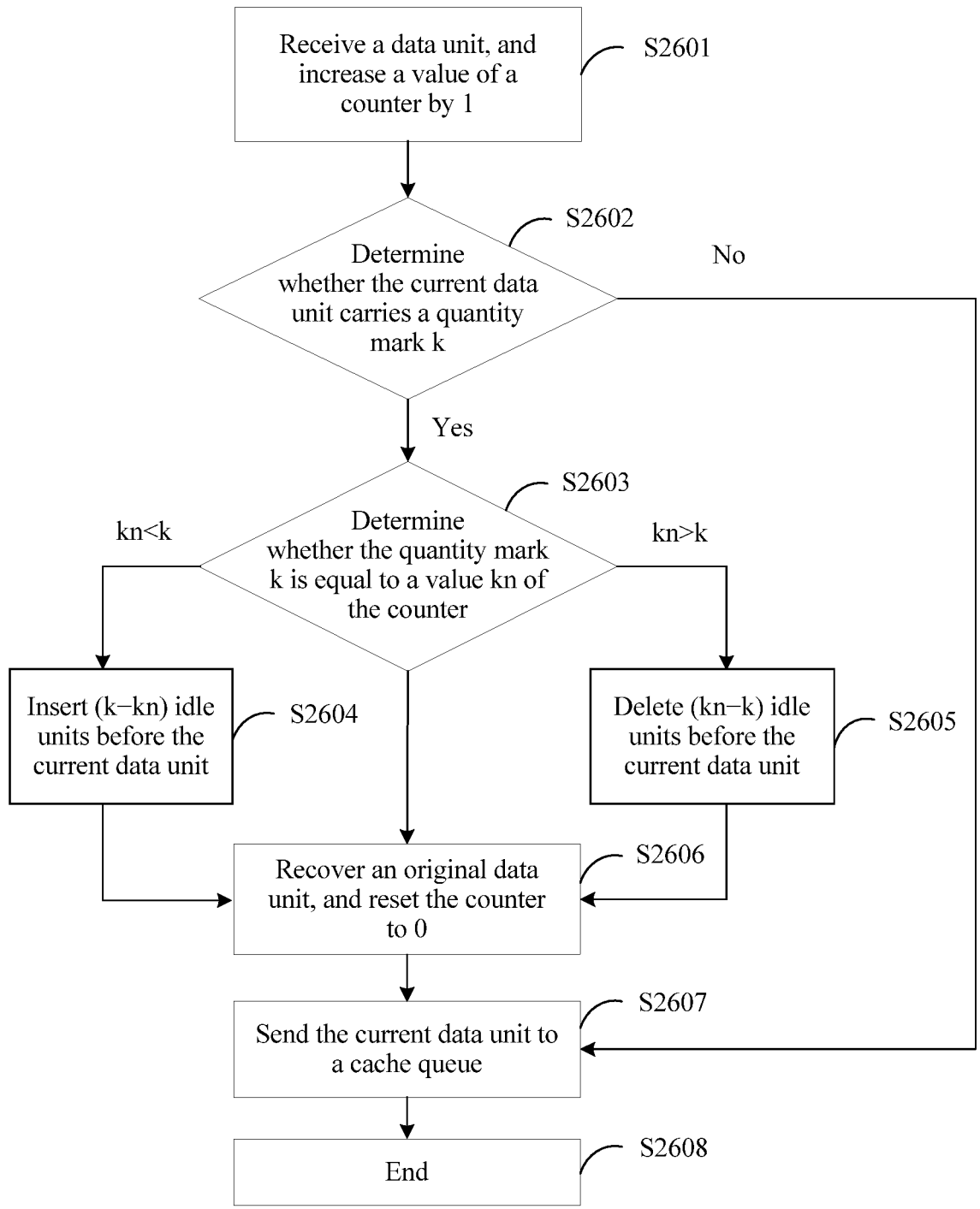
FIG. 26 is a flowchart of a quantity mark extraction method according to an embodiment of the present invention.

FIG. 26 is a flowchart of a quantity mark extraction method according to an embodiment of the present invention. As shown in FIG. 26, in S2601, a counter is set, and when a data unit is received from a first data stream, a value of the counter is increased by 1. A data format of the data unit may include a code block, a byte, or the like. For example, the data format of the data unit is a code block, a data unit in the first data stream may include a start code block S, a termination code block T, a code block D, and an idle code block (Idle), and the like. In S2602, if the current data unit carries a quantity mark k, S2603 is performed, to determine whether the quantity mark k is equal to a current value kn of the counter. In S2604, if kn<k, (k−kn) idle units are inserted before the current data unit. In S265, if kn>k, (kn−k) idle units are deleted before the current data unit. S2606 is performed after S2604 or S2605 is performed. If kn=k, S2606 is directly performed, to recover an original data unit from the current data unit, and reset the counter to 0. If the current data unit is an idle unit before a quantity mark is inserted, an idle unit is recovered from the current data unit. If the current data unit is a start unit before a quantity mark is inserted, the start unit is recovered from the current data unit. In S2607, the current data unit from which the original data unit is recovered is sent to a cache queue. In S2608, the procedure ends, to continue to receive a next data unit of the first data stream. In S2602, if the current data unit does not carry a quantity mark k, the current data unit is sent to a cache queue. In S2608, the procedure ends, to continue to receive a next data unit of the first data stream. According to the foregoing method procedure, the recovered data stream and an original data stream obtained by a transmit end device have a same quantity of data units, or have a same quantity of idle units, so that the original data stream is recovered.

Figure 27:
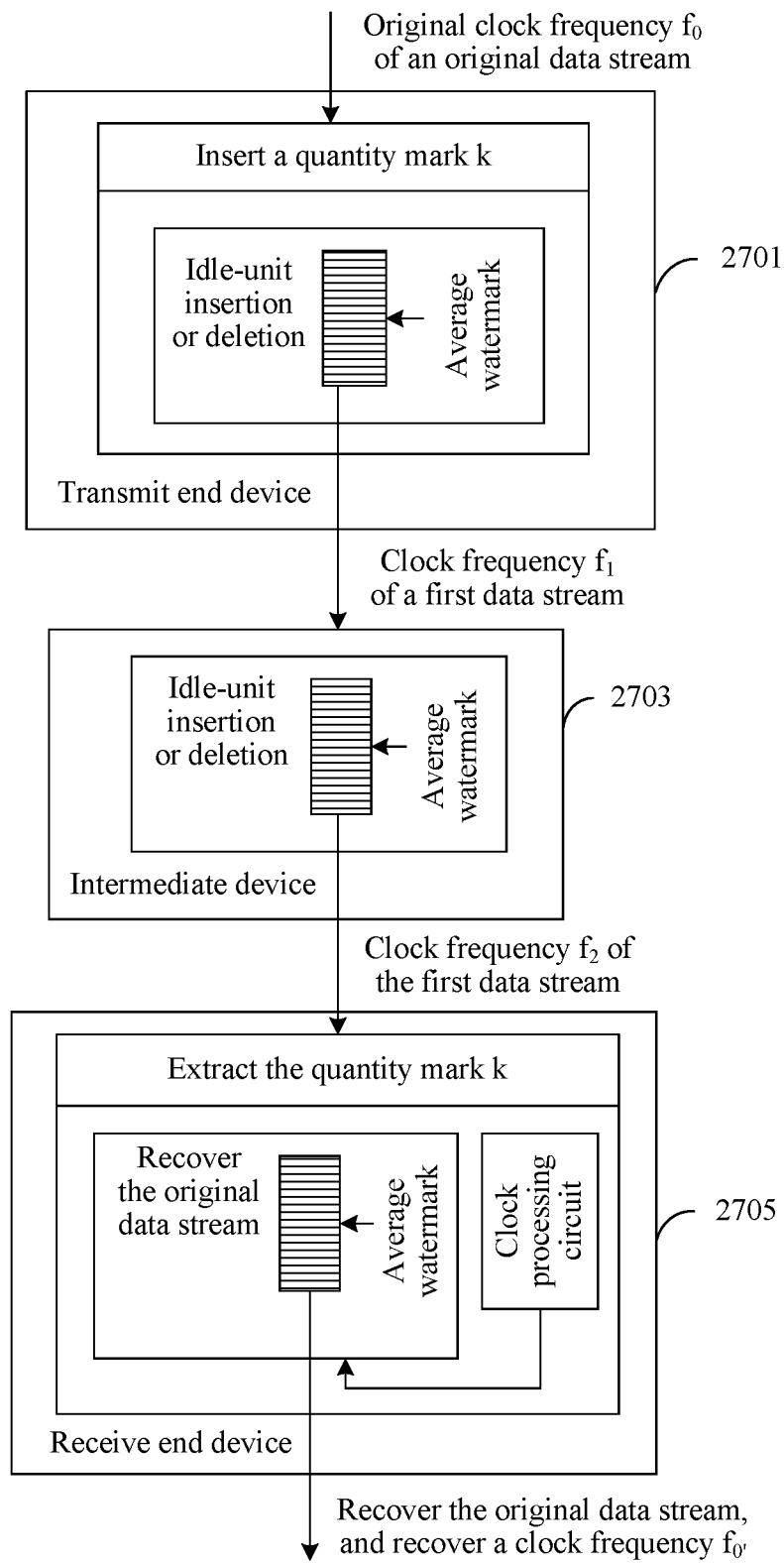
FIG. 27 is a schematic structural diagram of a clock frequency recovery system according to an embodiment of the present invention.

FIG. 27 is a schematic structural diagram of a clock frequency recovery system according to an embodiment of the present invention. As shown in FIG. 27, a transmit end device 2701 and an intermediate device 2703 may perform idle-unit insertion or deletion, to implement rate adaption. Therefore, a clock frequency is changed in a transport process. The transmit end device 2701 receives an original data stream whose clock frequency is $f_0$, and sends a first data stream whose clock frequency is $f_1$. The first data stream may pass at least one intermediate device 2703, and the intermediate device 2703 may change the clock frequency of the first data stream, for example, from $f_1$ to $f_2$. A receive end device 2705 recovers a clock frequency $f_{0'}$ of the original data stream from the clock frequency $f_2$ of the first data stream. The recovered clock frequency $f_{0'}$ may be slightly different from the original clock frequency $f_0$. However, when a difference between the two frequencies falls within an allowable range, it may be considered that the original clock frequency is recovered.

In this embodiment of the present invention, how the receive end device 2705 recovers the original clock frequency is mainly described. The transmit end device 2701 inserts a quantity mark k into a data stream, and the receive end device 2705 may extract the quantity mark k from a received data stream. In a process of transporting and receiving data, specific cache space needs to be set for the transmit end device 2701, the intermediate device 2703, and the receive end device 2705. In the receive end device 2705, a depth of a cache queue may be adjusted in real time according to a difference between the quantity mark k and a value kn of a counter. For example, when the difference between k and kn is relatively large, the depth of the queue is relatively large. Referring to the method procedure in FIG. 26, a data unit in the first data stream is sent to the cache queue, and the original data stream is recovered. The receive end device 2705 may monitor an average watermark of the queue, and when the average watermark gradually increases, a clock frequency of the original data stream that is output from the queue gradually increases. When the average watermark gradually decreases, a clock frequency of the original data stream that is output from the queue gradually decreases. Smooth filtering may be performed, by using a clock processing circuit, on the clock frequency of the original data stream that is output from the queue, to keep the average watermark of the queue stable and unchanged, so that the original clock frequency $f_0$, is stably generated.

In this embodiment of the present invention, the receive end device extracts the quantity mark k from the first data stream, and the quantity mark k is used to identify the quantity of data units or idle units in the original data stream. In addition, the receive end device can recover the original data stream according to the quantity mark k, to recover a clock frequency and time phase information of the original data stream, so that a clock frequency and time phase information of a service are transparently transported.

Figure 28:
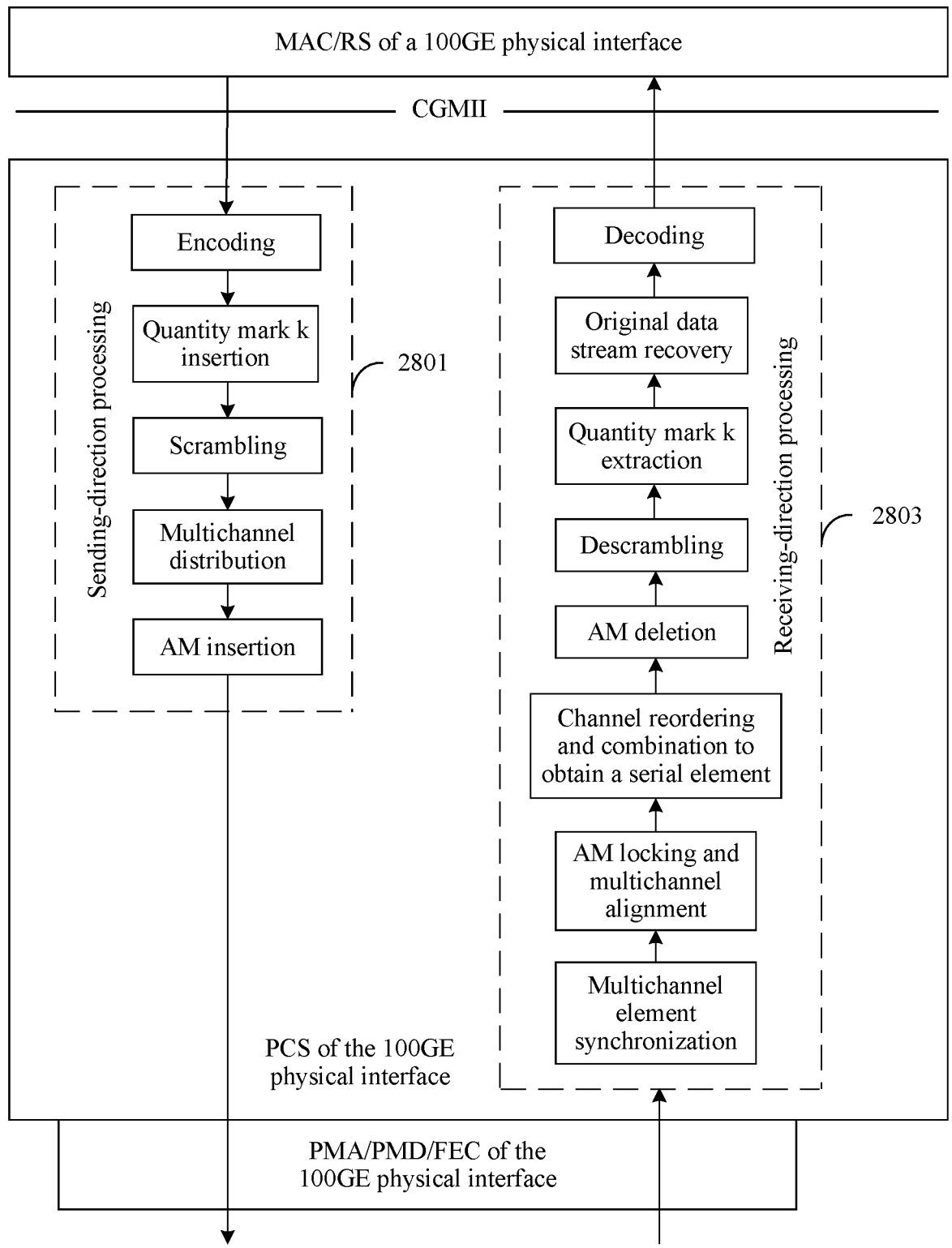
FIG. 28 is a schematic structural diagram of a customer device according to an embodiment of the present invention.
Figure 29:
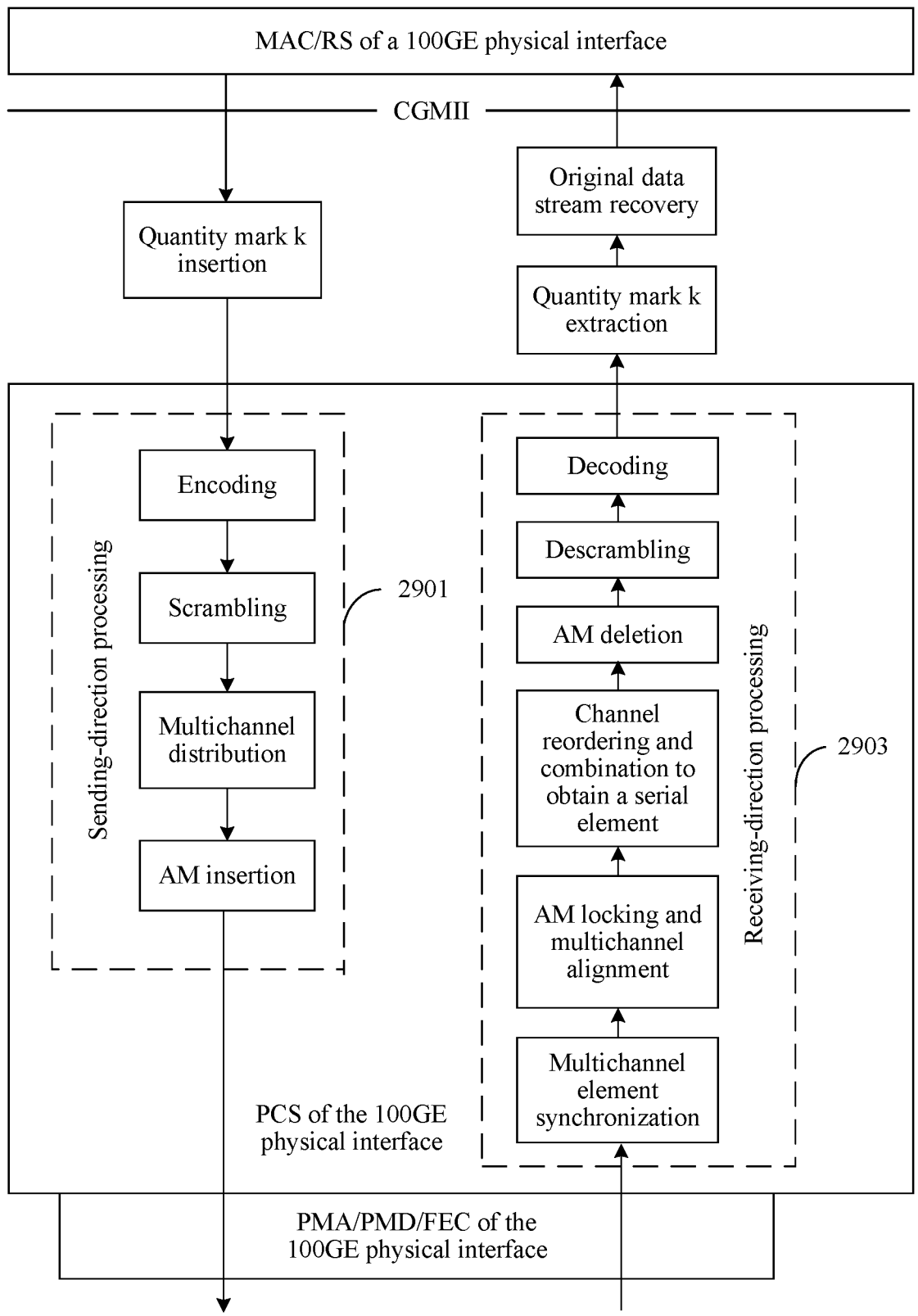
FIG. 29 is a schematic structural diagram of a customer device according to an embodiment of the present invention.

In another embodiment, the embodiments shown in FIG. 15 and FIG. 23 may be further implemented on a customer device. A 100 GE service is used as an example for description, and a principle of a 100 GE physical interface is similar to a principle of a 4 GE physical interface. FIG. 28 is a schematic structural diagram of a customer device according to an embodiment of the present invention. As shown in FIG. 28, a transmit end method may be executed after encoding in a sending direction 2801 of a 100 GE physical interface and before scrambling, and a receive end method may be executed after descrambling in a receiving direction 2803 of the 100 GE physical interface and before decoding. FIG. 29 is a schematic structural diagram of another customer device according to an embodiment of the present invention. As shown in FIG. 29, a transmit end method may be executed before encoding in a sending direction 2901 of a 100 GE physical interface, and a receive end method may be executed after decoding in a receiving direction 2903 of the 100 GE physical interface.

The technical solutions, in the embodiments of the present invention that are implemented on the customer device, can be effectively compatible with an existing bearer network.

Figure 30:
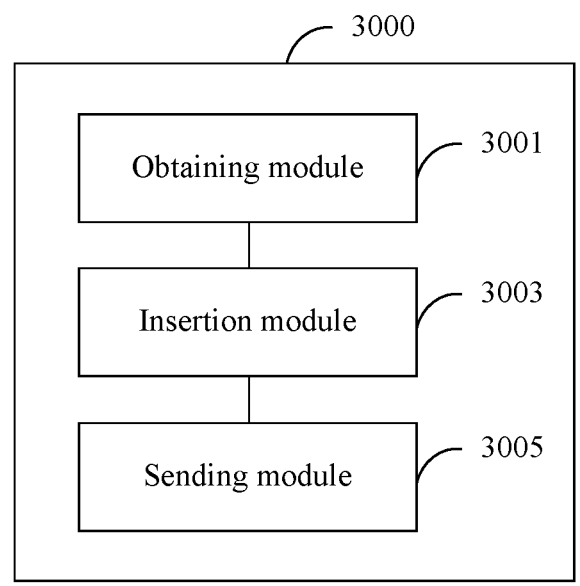
FIG. 30 is a schematic structural diagram of an apparatus for sending a service according to an embodiment of the present invention.

FIG. 30 is a schematic structural diagram of an apparatus 3000 for sending a service according to an embodiment of the present invention. The apparatus may be a flexible Ethernet device, an Ethernet device, an OTN device, an SDH device, or the like. As shown in FIG. 30, the apparatus 3000 may include: an obtaining module 3001, an insertion module 3003, and a sending module 3005. In this embodiment of the present invention, the function modules are obtained by means of logical division, and a division manner is not limited. For example, each module may be an independent circuit module, or may be integrated into a circuit module. Each module may be implemented by using an integrated circuit such as a chip. The apparatus 3000 for sending a service in this embodiment of the present invention may perform the method steps in the embodiment shown in FIG. 15.

The obtaining module 3001 is configured to obtain an original data stream. The insertion module 3003 is configured to insert a quantity mark k into the original data stream, to generate a first data stream. The quantity mark k is used to identify a quantity of first data units in the original data stream, and k is greater than or equal to 0. The sending module 3005 is configured to send the first data stream.

The insertion module 3003 is configured to: obtain a first segment of data stream from the original data stream, and determine a quantity of first data units in the first segment of data stream; and insert the quantity mark k at a first location in the first segment of data stream. A value of the quantity mark k is equal to the quantity of first data units in the first segment of data stream, and the first location is a location of a data unit that can be used to carry the quantity mark k.

Optionally, the first data unit includes all data units in the first segment of data stream, and k is an integer greater than 0. Optionally, the first data unit is an idle unit in the first segment of data stream, and k is an integer greater than or equal to 0.

The insertion module 3003 is configured to: identify a start unit in the original data stream, and determine a location of the start unit as the first location.

The insertion module 3003 is configured to: set a threshold of the quantity mark k; when a length of the first segment of data stream is greater than or equal to the threshold, identify a first idle unit in the first segment of data stream; and determine a location of the first idle unit as the first location.

Encoding processing has been performed on the first data unit, or encoding processing has not been performed on the first data unit.

The apparatus 3000 further includes: an insertion or deletion module, configured to increase and/or decrease a quantity of idle units in the first data stream.

In this embodiment of the present invention, the apparatus for sending a service adds the quantity mark k into the original data stream, and the quantity mark k is used to identify a quantity of data units or idle units in the original data stream. In this way, an apparatus for receiving a service can recover the original data stream according to the quantity mark k, to recover a clock frequency and time phase information of the original data stream, so that a clock frequency and time phase information of a service are transparently transported.

Figure 31:
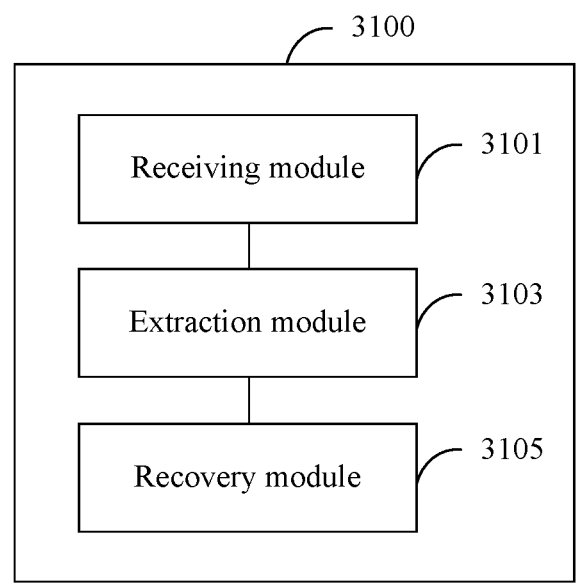
FIG. 31 is a schematic structural diagram of an apparatus for receiving a service according to an embodiment of the present invention.

FIG. 31 is a schematic structural diagram of an apparatus 3100 for receiving a service according to an embodiment of the present invention. The apparatus may be a flexible Ethernet device, an Ethernet device, an OTN device, an SDH device, or the like. As shown in FIG. 31, the apparatus may include: a receiving module 3101, an extraction module 3103, and a recovery module 3105. In this embodiment of the present invention, the function modules are obtained by means of logical division, and a division manner is not limited. For example, each module may be an independent circuit module, or may be integrated into a circuit module. Each module may be implemented by using an integrated circuit such as a chip. The apparatus 3100 for receiving a service in this embodiment of the present invention may perform the method steps in the embodiment shown in FIG. 23.

The receiving module 3101 is configured to receive a first data stream. The extraction module 3103 is configured to: extract a quantity mark k from the first data stream, and determine a quantity of first data units in the first data stream, where k is greater than or equal to 0. The recovery module 3105 is configured to recover the original data stream from the first data stream. A quantity of first data units in the original data stream is equal to k.

The extraction module 3103 is configured to: obtain a first segment of data stream from the first data stream, determine a first location in the first segment of data stream, and extract the quantity mark k from the first location. The first location is a location of a data unit that can be used to carry the quantity mark k.

Optionally, the first data unit includes all data units in the first segment of data stream, and k is an integer greater than 0. Optionally, the first data unit is an idle unit in the first segment of data stream, and k is an integer greater than or equal to 0.

The recovery module 3105, configured to: determine a quantity m of first data units in the first segment of data stream, and adjust the quantity m of first data units in the first segment of data stream according to a difference between m and k, so that m is equal to k.

The recovery module 3105 is configured to: when m is greater than k, delete (m−k) idle units from the first segment of data stream; or when m is less than k, insert (k−m) idle units into the first segment of data stream.

The apparatus 3100 further includes a clock module, configured to recover a clock frequency of the original data stream.

In this embodiment of the present invention, the apparatus for receiving a service extracts the quantity mark k from the first data stream, and the quantity mark k is used to identify a quantity of data units or idle units in the original data stream. In addition, the apparatus for receiving a service can recover the original data stream according to the quantity mark k, to recover a clock frequency and time phase information of the original data stream, so that a clock frequency and time phase information of a service are transparently transported.

Figure 32:
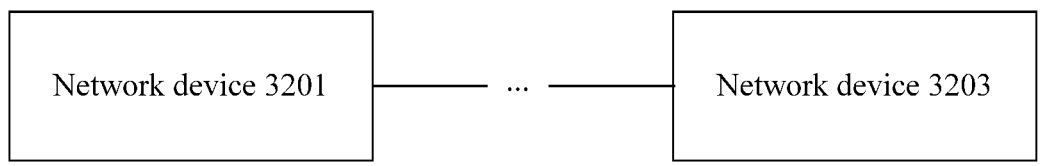
FIG. 32 is a schematic structural diagram of a network system according to an embodiment of the present invention.

FIG. 32 is a schematic structural diagram of a network system according to an embodiment of the present invention. The network system may be the flexible Ethernet, the Ethernet, an OTN network, an SDH network, or the like. As shown in FIG. 32, the network system may include at least two network devices, for example, a network device 3201 and a network device 3203. Each network device may be a sending network device or a receiving network device, and may have the structure shown in FIG. 30 and/or FIG. 31.

Figure 33:
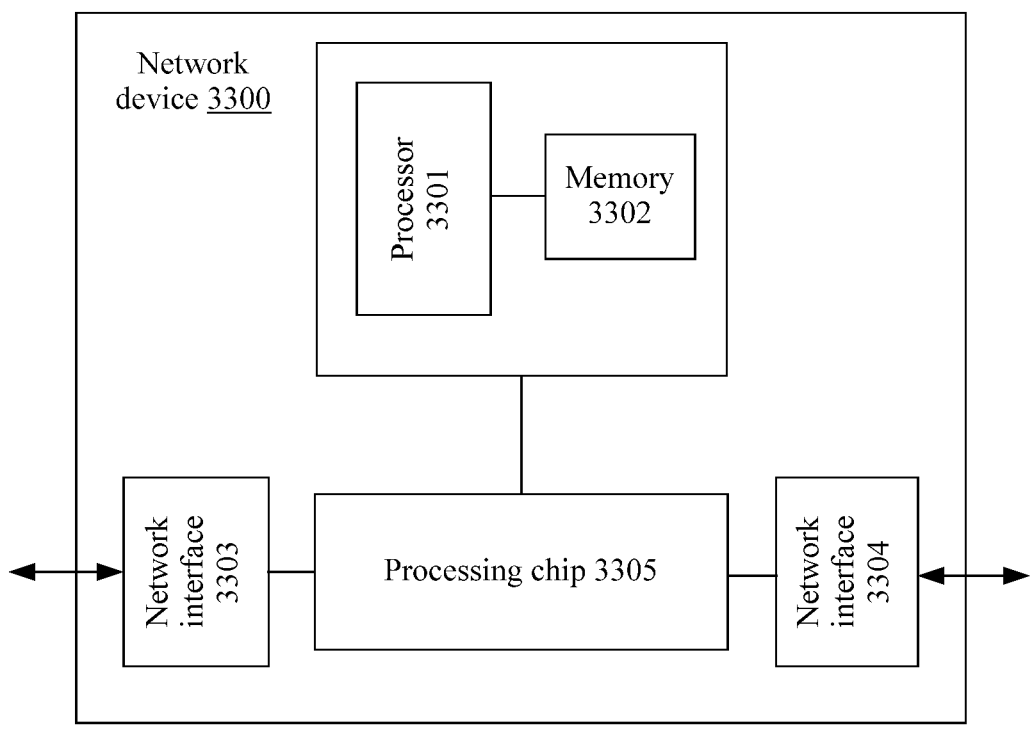
FIG. 33 is a schematic structural diagram of a network device according to an embodiment of the present invention.

FIG. 33 is a schematic structural diagram of a network device according to an embodiment of the present invention. The network device may be the flexible Ethernet device, an Ethernet device, an OTN device, an SDH device, or the like. As shown in FIG. 33, the network device 3300 may include: a processor 3301, a memory 3302, at least one network interface (for example, a network interface 3303 and network interface 3304), and a processing chip 3305.

The processor 3301 may use a general-purpose central processing unit (CPU), a microprocessor, a network processor (NPU), an application-specific integrated circuit (ASIC), or at least one integrated circuit to execute a related program, to implement the technical solutions provided in the embodiments of the present invention.

The memory 3302 may be a read-only memory (ROM), a static storage device, a dynamic storage device, or a random access memory (RAM). The memory 3302 may store an operating system and another application program. When the technical solutions provided in the embodiments of the present invention are implemented by using software or firmware, program code used to implement the technical solutions provided in the embodiments of the present invention is stored in the memory 3302, and is executed by the processor 3301.

The network interface 3303 and the network interface 3304 each use a transceiver apparatus which includes but is not limited to a transceiver, to implement communication between the network device 3300 and another device or communications network. For example, the network interface 3303 and the network interface 3304 each may have a sending function or a receiving function, or may have both a sending function and a receiving function. Herein, the network interface 3303 and the network interface 3304 each may be a logical port (for example, a logical port formed by several timeslots), or may be a physical interface (for example, a 100 G flexible Ethernet physical interface).

The processing chip 3305 may be implemented by using an ASIC, a field-programmable gate array (FPGA), or the like. The processing chip 3305 may be a dedicated chip for implementing the technical solutions in the present invention, or may be a general-purpose chip having functions of the technical solutions in the present invention.

In one example, the network device 3300 obtains an original data stream by using the network interface 3303 or the network interface 3304. The network device 3300 executes, by using the processor 3301, the code stored in the memory 3302, or the processing chip 3305 executes code stored in the processing chip 3305, to perform the following steps: inserting a quantity mark k into the original data stream, to generate a first data stream, where the quantity mark k is used to identify a quantity of first data units in the first original data stream, and k is greater than or equal to 0; and sending the first data stream by using the network interface 3304 or the network interface 3303.

In another example, the network device 3300 receives a first data stream by using the network interface 3303 or the network interface 3304. The network device 3300 executes, by using the processor 3301, the code stored in the memory 3302, or the processing chip 3305 executes code stored in the processing chip 3305, to perform the following steps: extracting a quantity mark k from the first data stream, and determining a quantity of first data units in the first data stream, where k is greater than or equal to 0; and recovering the original data stream from the first data stream, where a quantity of first data units in the original data stream is equal to k.

Specifically, the technical solutions in any embodiment of the present invention may be implemented by using the network device 3300 shown in FIG. 33. For example, the apparatus 3000 in FIG. 30 and the apparatus 3100 in FIG. 31 may be implemented by using the structure and the solutions of the network device 3300. It should be noted that although for the network device 3300 shown in FIG. 33, only the processor 3301, the memory 3302, the network interface 3303 and the network interface 3304, and the processing chip 3305 are shown, in a specific implementation process, a person skilled in the art should understand that the network device 3300 further includes another component required for implementing normal running. In addition, a person skilled in the art should understand that, according to a specific requirement, the network device 3300 may further include a hardware component for implementing another additional function. For example, the network device 3300 may include a power supply, a fan, a clock unit, a control unit, or the like. In addition, a person skilled in the art should understand that the network device 3300 may also include only a component required for implementing the embodiments of the present invention, and does not need to include all components shown in FIG. 33.

In this embodiment of the present invention, a transmit end network device adds the quantity mark k into the original data stream, and the quantity mark k is used to identify a quantity of data units or idle units in the original data stream. In this way, a receive end network device can determine, according to the quantity mark k, the quantity of data units or idle units in the original data stream, to recover the original data stream, and recover a clock frequency and time phase information of the original data stream, so that a clock frequency and time phase information of a service are transparently transported.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
obtaining, by a transmit end device, an original data stream;
inserting, by the transmit end device, a quantity mark k into the original data stream, to generate a first data stream, wherein a value of the quantity mark k is equal to a quantity of first data units in the original data stream, and k is greater than or equal to zero (o);
increasing or decreasing, by the transmit end device, a quantity of idle units in the first data stream; and
sending, by the transmit end device, the first data stream.

2. The method according to claim 1, wherein inserting the quantity mark k into the original data stream comprises:
obtaining a first segment of data stream from the original data stream;
determining a quantity of first data units in the first segment of data stream; and
inserting the quantity mark k at a first location in the first segment of data stream, wherein the value of the quantity mark k is equal to the quantity of first data units in the first segment of data stream, and the first location is a location of a data unit that is usable to carry the quantity mark k.

3. The method according to claim 2, wherein the first data units in the first segment of data stream comprise all data units in the first segment of data stream.

4. The method according to claim 2, wherein the first data units in the first segment of data stream comprise an idle unit in the first segment of data stream.

5. The method according to claim 2, wherein obtaining the first segment of data stream from the original data stream comprises:
identifying a start unit in the original data stream; and
determining a location of the start unit as the first location.

6. The method according to claim 2, wherein obtaining the first segment of data stream from the original data stream comprises:
setting a threshold of the quantity mark k;
when a length of the first segment of data stream is greater than or equal to the threshold, identifying a first idle unit in the first segment of data stream; and
determining a location of the first idle unit as the first location.

7. The method according to claim 1, wherein encoding processing has been performed on the first data units, or encoding processing has not been performed on the first data units.

8. A method, comprising:
receiving, by a receive end device, a first data stream, wherein the first data stream comprises a quantity mark k, a value of K is equal to a quantity of first data units in an original data stream, and k is greater than or equal to zero (o);
extracting, by the receive end device, the quantity mark k from the first data stream;
determining, by the receive end device, a quantity of first data units in the first data stream; and
recovering, by the receive end device according to the quantity mark k, an original data stream from the first data stream.

9. The method according to claim 8, wherein extracting the quantity mark k from the first data stream comprises:
obtaining a first segment of data stream from the first data stream;
determining a first location in the first segment of data stream, wherein the first location is a location of a data unit that is usable to carry the quantity mark k; and
extracting the quantity mark k from the first location.

10. The method according to claim 9, wherein the first data units in the first data stream comprise all data units in the first segment of data stream.

11. The method according to claim 9, wherein the first data units comprise an idle unit in the first segment of data stream0.

12. The method according to claim 9, wherein recovering the original data stream from the first data stream comprises:
determining a quantity m of first data units in the first segment of data stream; and
adjusting the quantity m of first data units in the first segment of data stream according to a difference between m and k, wherein after the adjusting m is equal to k.

13. The method according to claim 12, wherein adjusting the quantity m of first data units in the first segment of data stream according to the difference between m and k comprises:
when m is greater than k, deleting (m−k) idle units from the first segment of data stream; or
when m is less than k, inserting (k−m) idle units into the first segment of data stream.

14. The method according to claim 8, further comprising:
recovering a clock frequency of the original data stream.

15. A network system, comprising:
a first apparatus; and
a second apparatus;
wherein the first apparatus comprises:
a first processor; and
a first non-transitory computer-readable storage medium storing a first program to be executed by the first processor, the first program including instructions to:
obtain an original data stream;
insert a quantity mark k into the original data stream, to generate a first data stream, wherein a value of the quantity mark k is equal to a quantity of first data units in the original data stream, and k is greater than or equal to zero (0);
increase or decrease a quantity of idle units in the first data stream; and
send the first data stream.

16. The system according to claim 15, wherein the instructions to insert the quantity mark k include instructions to:
obtain a first segment of data stream from the original data stream;
determine a quantity of first data units in the first segment of data stream; and insert the quantity mark k at a first location in the first segment of data stream, wherein the value of the quantity mark k is equal to the quantity of first data units in the first segment of data stream, and the first location is a location of a data unit that is usable to carry the quantity mark k.

17. The system according to claim 16, wherein the instructions to insert the quantity mark k include instructions to:
identify a start unit in the original data stream; and
determine a location of the start unit as the first location.

18. The system according to claim 16, wherein the instructions to insert the quantity mark k include instructions to:
set a threshold of the quantity mark k;
when a length of the first segment of data stream is greater than or equal to the threshold, identify a first idle unit in the first segment of data stream; and
determine a location of the first idle unit as the first location.

19. The system according to claim 15, wherein the second apparatus comprises:
a second processor; and
a second non-transitory computer-readable storage medium storing a second program to be executed by the second processor, the second program including instructions to:
receive the first data stream;
extract the quantity mark k from the first data stream;
determine the quantity of first data units in the first data stream; and
recover the original data stream from the first data stream.

20. The system according to claim 19, wherein the instructions to extract the quantity mark k from the first data stream include instructions to:
obtain a first segment of data stream from the first data stream;
determine a first location in the first segment of data stream; and
extract the quantity mark k from the first location, wherein the first location is a location of a data unit that is usable to carry the quantity mark k.

21. The system according to claim 20, wherein the instructions to recover the original data stream from the first data stream include instructions to:
determine a quantity m of first data units in the first segment of data stream; and
adjust the quantity m of first data units in the first segment of data stream according to a difference between m and k, wherein after the adjusting m is equal to k.

* * * * *